United States Patent
Borysyonok et al.

(10) Patent No.: US 12,299,236 B2
(45) Date of Patent: May 13, 2025

(54) KEYBOARD

(71) Applicant: Clevetura LTD, Limassol (CY)

(72) Inventors: Vasily Borysyonok, Limassol (CY); Dzmitry V. Zakreuski, Limassol (CY); Raman Sakovich, Limassol (CY); Mikhail Yu Krupiankou, Limassol (CY); Yury V. Lahutski, Limassol (CY)

(73) Assignee: Clevetura LTD, Limassol (CY)

( * ) Notice: Subject to any disclaimer, the term of this patent is extended or adjusted under 35 U.S.C. 154(b) by 0 days.

(21) Appl. No.: 18/561,781

(22) PCT Filed: May 19, 2022

(86) PCT No.: PCT/EP2022/063642
§ 371 (c)(1),
(2) Date: Nov. 17, 2023

(87) PCT Pub. No.: WO2022/243476
PCT Pub. Date: Nov. 24, 2022

(65) Prior Publication Data
US 2024/0241604 A1    Jul. 18, 2024

(30) Foreign Application Priority Data

May 19, 2021 (GB) ..................... 2107178
Jan. 5, 2022 (GB) ..................... 2200071

(51) Int. Cl.
*G06F 3/0488* (2022.01)
*G06F 1/16* (2006.01)
*G06F 3/041* (2006.01)

(52) U.S. Cl.
CPC .......... *G06F 3/0418* (2013.01); *G06F 1/1662* (2013.01); *G06F 2203/04103* (2013.01)

(58) Field of Classification Search
CPC ............... G06F 3/0418; G06F 1/1662; G06F 2203/04103; G06F 3/0425; G06F 3/0304
See application file for complete search history.

(56) References Cited

U.S. PATENT DOCUMENTS 7,151,528 B2   12/2006   Taylor et al.
9,548,012 B1 *  1/2017   Sjoberg ............. G06F 3/0425
(Continued)

FOREIGN PATENT DOCUMENTS

CN    201465031 U    5/2010
CN    202720583 U    2/2013
(Continued)

OTHER PUBLICATIONS

International Search Report and Written Opinion for Application No. PCT/EP2022/063642 dated Sep. 26, 2022 (14 pages).

(Continued)

*Primary Examiner* — Abdul-Samad A Adediran
(74) *Attorney, Agent, or Firm* — Michael Best & Friedrich LLP

(57) ABSTRACT

There is described a combined touch sensor and keypress sensor comprising: a first layer, comprising: at least a portion of a plurality of touch sensor electrodes; and exposed portions of a plurality of keypress sensor electrodes; and a second, connecting, layer, comprising: connecting lines that connect the exposed portions of the keypress sensor electrodes.

19 Claims, 23 Drawing Sheets

(56) References Cited

U.S. PATENT DOCUMENTS

| | | | |
|---|---|---|---|
| 10,353,485 B1 | 7/2019 | Zhang et al. | |
| 2017/0153812 A1* | 6/2017 | Creager | ................ G06F 3/0304 |
| 2020/0012354 A1 | 1/2020 | Cho | |

FOREIGN PATENT DOCUMENTS

| | | | |
|---|---|---|---|
| CN | 113467644 A | 10/2021 |
| WO | 2019237173 A1 | 12/2019 |
| WO | 2021094600 A1 | 5/2021 |

OTHER PUBLICATIONS

International Search Report and Written Opinion for Application No. PCT/EP2022/063642 dated Nov. 16, 2022 (19 pages).
United Kingdom Patent Office Search Report for Application No. GB2107178.2 dated Mar. 17, 2022 (3 pages).
United Kingdom Patent Office Search Report for Application No. GB2200071.5 dated Sep. 8, 2022 (3 pages).

* cited by examiner

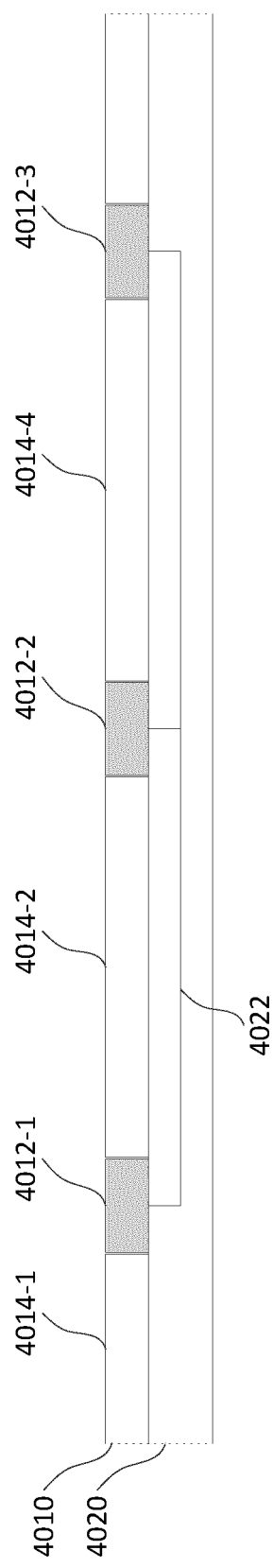

KEYBOARD

FIELD OF THE DISCLOSURE

The present disclosure relates to a keyboard. In particular the present disclosure relates to a keyboard comprising a touch sensor.

BACKGROUND TO THE DISCLOSURE

A typical method of controlling the operation of computer devices is to use a keyboard and/or a touchpad. These components enable a user to interact with a computer, e.g. to send instructions to a processor. Ideally, these components are user-friendly; however, present keyboards and touchpads have a number of flaws.

A particular problem is that in order to use a conventional touchpad after typing a user must move their hand from the keyboard to the touchpad. In order to begin typing again at full speed, the user must move this hand back from the touchpad to the keyboard. While this movement can be quite quick, it is likely to be repeated thousands of times over the course of a year, which can lead to a significant cumulative time and focus requirement. Therefore, it would be beneficial to integrate a touch sensor with a keyboard to reduce the need for this movement. However, integration can lead to a keyboard that lacks user friendliness and is bulky.

A solution to this problem is desired.

SUMMARY OF THE DISCLOSURE

According to an aspect of the present disclosure, there is described: a keyboard comprising: a plurality of keys; and a touch sensor for detecting a touch of a user on the keys; wherein the keyboard is arranged to detect a keypress relating to the keys using the touch sensor; and wherein the keyboard (e.g. a control unit of the keyboard) is arranged to process signals from the touch sensor based on: a first scanning mode associated with a first scanning period; and a second scanning mode associated with a second scanning period; wherein the first scanning period is greater than the second scanning period.

According to an aspect of the present disclosure, there is described: a keyboard comprising: a plurality of keys; and a touch sensor for detecting a touch of a user on the keys; wherein the keyboard is arranged to detect a keypress relating to the keys using the touch sensor; and wherein the keyboard (e.g. a control unit of the keyboard) is arranged to process signals from the touch sensor based on: a first scanning mode associated with a first scanning rate; and a second scanning mode associated with a second scanning rate; wherein the second scanning rate is greater than the first scanning rate.

The first mode may be a touch scanning mode. The second mode may be a keypress scanning mode.

Preferably, each key is associated with a conductive coating, such that when said key is pressed the corresponding coating moves relative to the touch sensor.

Preferably, each coating is arranged on a transmittal mechanism of the corresponding key. Preferably, each coating is arranged on: an exterior surface, an interior surface, and/or a tip of the transmittal mechanism.

Preferably, the transmittal mechanism comprises a dome.

Preferably, the coating comprises a metal coating. Preferably, the coating comprises a metal oxide semiconductor.

Preferably, the touch sensor comprises a capacitive sensor.

Preferably, the touch sensor comprises a mutual capacitance sensor.

Preferably, the touch sensor comprises a self capacitance sensor.

Preferably, the touch sensor is arranged to operate in: a mutual capacitance mode; and a self capacitance mode.

Preferably, the first scanning mode comprises a mutual capacitance mode and the second scanning mode comprises a self capacitance mode. Where the second scanning mode comprises a self capacitance mode, the second scanning mode may be a keypress detection mode.

Preferably, the keyboard is arranged to operate in only the first and second scanning modes.

Preferably, each of the first scanning mode and the second scanning mode comprises a mutual capacitance mode. Where the second scanning mode comprises a mutual capacitance mode, the second scanning mode may be a keypress scanning mode.

Preferably, the touch sensor is arranged to operate based on a third scanning mode associated with a third scanning period and/or a third scanning rate. Preferably, the third scanning rate is greater than the second scanning rate. Preferably, the third scanning period is less than the second scanning period.

Preferably, the third scanning rate is at least 500 Hz. Preferably, the third scanning rate is in the range of 500 Hz-1000 Hz.

Preferably, the third scanning period is no more than 2 ms. Preferably, the third scanning period is in the range of 1 ms-2 ms. The third scanning mode may be a keypress detection mode.

Preferably, the third mode comprises a self capacitance mode.

Preferably, the first mode and/or the second mode comprises a mutual capacitance mode.

Preferably, the touch sensor is arranged to switch from the first mode to the second mode based on the detecting of a keypress. Preferably, the first scanning mode is the default mode.

Preferably, the touch sensor is arranged to switch from the first mode to the third mode based on the detecting of a keypress.

Preferably, the touch sensor is arranged to switch from the third mode to the second mode based on the detecting of a keypress.

Preferably, the touch sensor is arranged to switch from the second mode to the first mode in dependence on the touch sensor not detecting a keypress for a threshold time.

Preferably, the touch sensor is arranged to switch from the third mode to the first mode in dependence on the touch sensor not detecting a keypress for a threshold time.

Preferably, the threshold time is no more than 10 ms.

Preferably, detecting a keypress comprises detecting a signal with a magnitude that exceeds a threshold magnitude.

Preferably, the keyboard is arranged to output only touch events in the first scanning mode and/or to output only keypress events in the second scanning mode and/or the third scanning mode.

Preferably, the touch sensor is arranged to operate in the first scanning mode and the second scanning mode alternately.

Preferably, the touch sensor is arranged to operate in the first scanning mode and the second scanning mode simultaneously.

Preferably, the touch sensor is arranged to operate using a combined frame, the combined frame comprising a first frame associated with the first scanning mode and one or more second frames associated with the second scanning mode.

Preferably, the combined frame comprises a plurality of second frames.

Preferably, the keyboard is arranged to detect a touch event and/or a keypress event by integrating a signal received by the touch sensor.

Preferably, the keyboard is arranged to detect a touch event by integrating a signal received by the touch sensor over the first scanning period.

Preferably, the keyboard is arranged to detect a keypress event by integrating a signal received by the touch sensor over the second scanning period.

Preferably, the keyboard is arranged to detect a keypress event by detecting a signal with a magnitude that exceeds a threshold magnitude.

Preferably, the keyboard comprises, and/or is associated with, a control unit.

Preferably, the control unit is arranged to control the keyboard and/or the touch sensor.

Preferably, the control unit is arranged to process signals from the touch sensor in order to detect touch events and/or keypress events.

Preferably, the control unit is arranged to distinguish between a touch and a keypress.

Preferably, the control unit is arranged to distinguish between a touch and a keypress based on one or more of: a magnitude of a change measured by the touch sensor; a duration of a change measured by the touch sensor; a rate of a change measured by the touch sensor; a direction of a movement measured by the touch sensor; and a mode of the keyboard.

Preferably, the keyboard is arranged to operate in a plurality of input modes. Preferably, the scanning mode used by the touch sensor is dependent on a selected input mode. Preferably, the input modes include a pointer input mode and a keypress input mode.

Preferably, the first scanning rate is no more than 200 Hz. Preferably, the first scanning rate is in the range of 100 Hz-200 Hz.

Preferably, the first scanning period is at least 5 ms. Preferably, the first scanning period is in the range of 5 ms-10 ms.

Preferably, the second scanning rate is at least 200 Hz. Preferably, the second scanning rate is in the range of 200 Hz-500 Hz.

Preferably, the second scanning period is no more than 5 ms. Preferably, the second scanning period is in the range of 2 ms-5 ms.

According to another aspect of the present disclosure, there is described the aforesaid touch sensor.

According to another aspect of the present disclosure, there is described the aforesaid control unit.

Preferably, the touch sensor comprises a plurality of rows and columns of electrodes.

Preferably, the touch sensor is arranged so that the intersections of the rows and columns of electrodes are located beneath the keys and/or beneath the coatings.

Preferably, the touch sensor is arranged so that the keys and/or the coatings are located above intersections of the rows and columns of electrodes Preferably, the keyboard is arranged to detect a keypress relating to the keys using the touch sensor.

According to another aspect of the present disclosure, there is described a keyboard comprising: a plurality of keys; and a touch sensor for detecting the touch of a user on the keys; wherein the keyboard is arranged to detect a keypress relating to the keys using the touch sensor.

Preferably, the touch sensor comprises a capacitive sensor.

Preferably, the touch sensor comprises a mutual capacitance sensor. Preferably, the touch sensor comprises a plurality of rows and columns of electrodes.

Preferably, the touch sensor is arranged so that the intersections of the rows and columns are beneath the keys.

Preferably, the keyboard comprises a coating, wherein the coating is arranged to move relative to the touch sensor when a key is pressed. Preferably the coating is arranged on a component of the keyboard. Preferably the coating is arranged on a key of the keyboard.

Preferably, each key comprises a coating such that when a key is pressed the corresponding coating moves relative to the touch sensor. Preferably each key relates to and/or comprises a plurality of coating elements.

Preferably, the touch sensor is arranged to detect a movement of the coating. Preferably, the touch sensor is arranged to detect a change in a local electric field caused by the movement of the coating.

Preferably, the coating is arranged on a/the transmittal mechanism of the keys.

Preferably, the coating is arranged on: an exterior surface, an interior surface, and/or a tip of the transmittal mechanism, preferably wherein the transmittal layer comprises a dome.

Preferably, the coating comprises a conductive coating and/or a metal coating.

Preferably the keyboard is arranged to detect a keypress based on a movement of the coating and/or based on a change in conductivity caused by a movement of the coating.

Preferably, the coating is arranged to interact with the touch sensor so as to enable the detection of the keypress.

Preferably, the coating is arranged to cause a substantial alteration in the local electric field around the touch sensor when the key is depressed so as to enable the detection of the keypress.

Preferably, the touch sensor is arranged so that the keys approach and/or impact the touch sensor when the keys are depressed.

Preferably, the touch sensor is arranged so that the coating approaches and/or impacts the touch sensor when the keys are depressed.

Preferably, the keyboard further comprises a controller for distinguishing between the touch of a user and the keypress.

Preferably, in order to distinguish between the touch of a user and the keypress, the controller is arranged to determine at least one of: a magnitude of a change measured by the touch sensor; a duration of a change measured by the touch sensor; a rate of a change measured by the touch sensor; a direction of a movement measured by the touch sensor; and a mode of the keyboard.

Preferably, the controller is calibrated to determine at least one of: a baseline output; an output corresponding to a touch input; and an output corresponding to a keypress.

According to another aspect of the present disclosure, there is described a method of manufacturing the aforesaid keyboard.

According to another aspect of the present disclosure, there is described a control unit for the aforesaid keyboard.

Calibration According to an aspect of the present disclosure, there is described a method of associating calibration information with a keyboard comprising a touch sensor, the method comprising: determining calibration information for a further keyboard comprising a touch sensor; and associating the calibration information with the keyboard.

Preferably, the keyboard and the further keyboard are similar keyboards.

Preferably, the method comprises comprising determining calibration information for a plurality of further keyboards comprising similar touch sensors, combining this calibration information, and associating the combined calibration information with the keyboard.

Preferably, the plurality of further keyboards comprises a plurality of similar keyboards, more preferably a plurality of keyboards from the same product series. Preferably, the plurality of further keyboards comprises at least two further keyboards, at least five further keyboards, and/or at least ten further keyboards.

Preferably, combining the calibration information comprises averaging the calibration information and/or removing extreme (e.g. outlier) values from the calibration information.

Preferably, the keyboard and the further keyboard comprise the same components (and/or the same types of components) and/or are from the same product series.

Preferably, the keyboard and the further keyboard comprise the same protective plate (and/or the same type of protective plate). Preferably, for each keyboard the protective plate is associated with a/the corresponding touch sensor.

Preferably, associating the calibration information with the keyboard comprises outputting the calibration information to a storage of the keyboard and/or outputting the calibration information to a separate computer device associated with the keyboard.

Preferably, the calibration information relates to one or more of: a location; a magnitude; and a direction.

Preferably, the calibration information relates to a difference between an expected touch signal and a detected touch signal.

Preferably, the calibration information is arranged to be combined with a detected touch signal.

Preferably, determining calibration information comprises determining calibration information for a plurality of points on the further keyboard, preferably a grid of points on the further keyboard.

Preferably, determining calibration information comprises determining calibration information using a machine, preferably a computer numerical control (CNC) machine.

Preferably, the method comprises determining a variation between the keyboard and the further keyboard; determining modified calibration information based on the calibration information and the variation; and associating the modified calibration information with the keyboard.

Preferably, the variation is associated with a difference in componentry between the keyboard and the further keyboard.

Preferably, the method comprises determining component calibration information for one or more of the components of the further keyboard. Preferably, the method comprises determining component calibration information for one or more components of a plurality of further keyboards, and determining the calibration information based on the component calibration information.

Preferably, the method comprises assembling the further keyboard.

Preferably, the method comprises assembling the keyboard.

According to another aspect of the present disclosure, there is described a method of manufacturing a keyboard comprising: providing a keyboard comprising a touch sensor; and associating calibration information with the keyboard according to the method of any preceding claim.

According to another aspect of the present disclosure, there is described a computer device comprising calibration information for a keyboard that comprises a touch sensor, wherein the calibration information is dependent on a further keyboard comprising a touch sensor.

Preferably, the calibration information has been determined for the further keyboard and thereafter has been associated with the keyboard.

Preferably, the further keyboard is a further, similar, keyboard and/or a further keyboard of the same product series as the keyboard.

Preferably, the computer device is arranged to apply the calibration information to a touch signal detected by the touch sensor.

Preferably, the computer device is arranged to: detect an input touch signal; modify the input touch signal based on the calibration information; and output the modified touch signal.

Preferably, modifying the input touch signal comprises modifying one or more of: the direction of the touch signal; the magnitude of the touch signal; and the direction of the touch signal.

Preferably, modifying the input touch signal based on the comprises modifying the input touch signal based on a datapoint of the calibration information.

Preferably, modifying the input touch signal comprises modifying the input touch signal based on a plurality of datapoints of the calibration information.

Preferably, modifying the input touch signal comprises modifying the input touch signal based on an interpolated datapoint that is determined based on an interpolation of the plurality of datapoints.

Preferably, modifying the input touch signal comprises modifying the input touch signal based on an extrapolated datapoint that is determined based on an extrapolation of the plurality of datapoints.

Preferably, the method comprises modifying the input touch signal based on an interpolated datapoint that is determined based on a bilinear interpolation of the plurality of datapoints.

According to another aspect of the present disclosure, there is described a keyboard comprising and/or being the aforesaid computer device.

According to another aspect of the present disclosure, there is described a method of modifying an input touch signal detected by a keyboard comprising a touch sensor, the method comprising: detecting an input touch signal; modifying the input touch signal based on calibration information; and outputting the modified touch signal; wherein the calibration information is dependent on a further keyboard comprising a touch sensor.

UMS

According to another aspect of the present disclosure, there is described a combined touch sensor and keypress sensor comprising: a first layer, comprising: at least a portion of a plurality of touch sensor electrodes; and exposed portions of a plurality of keypress sensor electrodes; and a second, connecting, layer, comprising: connecting lines that connect the exposed portions of the keypress sensor electrodes.

Preferably, the combined touch sensor and keypress sensor comprises a plurality of connecting layers.

Preferably, one or more of (and/or each of) the connecting layers comprises: connecting lines that connect exposed portions of the keypress sensor electrodes. Preferably, one or more of (and/or each of) the connecting layers comprises connecting lines that connect portions of the touch sensor electrodes.

Preferably, the combined touch sensor and keypress sensor comprises one or more keypress sensor connecting layers comprising connecting lines that connect exposed portions of the keypress sensor electrodes.

Preferably, the combined touch sensor and keypress sensor comprises one or more touch sensor connecting layers comprising connecting lines that connect portions of the touch sensor electrodes.

Preferably, the second connecting layer and/or a further connecting layer comprises connecting lines that connect lighting elements (e.g. LEDs).

Preferably, the combined touch sensor and keypress sensor comprises a ground layer and/or an insulating layer.

Preferably, the ground layer and/or the insulating layer is located between the first layer and the second layer.

Preferably, the touch sensor electrodes are arranged to avoid and/or circumvent the exposed portions.

Preferably, the touch sensor electrodes are located entirely on the first layer.

Preferably, the second layer and/or a further layer comprises touch sensor connecting lines that connect portions of the touch sensor electrodes that are located on the first layer.

Preferably, the combined touch sensor and keypress sensor comprises and/or is associated with a control unit that is arranged to: supply a voltage and/or current to the touch sensor electrodes and/or keypress sensor electrodes; and/or determine a voltage and/or current in the touch sensor electrodes and/or keypress sensor electrodes; and/or detect a keypress and/or touch input.

Preferably, the control unit is arranged to detect and/or drive a signal for another component of the keyboard in dependence on a signal relating to the electrodes of the touch sensor. Preferably, the other component is the electrodes of the keypress sensor.

Preferably, the control unit is arranged to supply a different magnitude of voltage and/or current to the touch sensor electrodes and the keypress sensor electrodes.

Preferably, the touch sensor electrodes comprise transmitting touch sensor electrodes and receiving touch sensor electrodes. Preferably, the keypress sensor electrodes comprise transmitting keypress sensor electrodes and receiving keypress sensor electrodes.

Preferably, the touch sensor electrodes and the keypress sensor electrodes are separated. Preferably, the touch sensor electrodes and the exposed portions of the keypress sensor electrodes are separated.

Preferably, the keypress sensor electrodes are arranged so that each of the exposed portions comprises a portion of a transmitting keypress sensor electrode and a portion of a receiving keypress sensor electrode.

Preferably, the keypress sensor electrodes are arranged so that when a key is pressed, a part of the key and/or a component associated with the key, connects portion of a transmitting keypress sensor electrode and a portion of a receiving keypress sensor electrode at one of the exposed portions.

Preferably, the component comprises one or more of: a transmittal mechanism; a conductive component; a conductive component located on a transmittal mechanism; and a metal oxide semiconductor.

Preferably, the combined touch sensor and keypress sensor comprises one or more lighting elements.

Preferably, wherein the first layer comprises one or more lighting elements.

Preferably, conductive lines connecting the lighting elements are located on the second layer and/or a further layer.

Preferably, the touch sensor electrodes and/or the keypress sensor electrodes comprise conductive patterns applied to a film.

According to another aspect of the present disclosure, there is described a printed circuit board comprising the combined touch sensor and keypress sensor of any preceding claim.

According to another aspect of the present disclosure, there is described a keyboard comprising the aforesaid combined touch sensor and keypress sensor.

According to another aspect of the present disclosure, there is described a keyboard comprising the aforesaid printed circuit board.

Preferably, the keyboard comprises a plurality of keys, wherein each exposed portion is located adjacent a corresponding key.

Preferably, the keyboard comprises a plurality of transmittal mechanisms, wherein each exposed portion is located adjacent a corresponding key, preferably wherein the transmittal mechanisms comprise silicone domes.

Preferably, each of the keys and/or each of the transmittal mechanisms is associated with a conductive coating.

Preferably wherein the conductive coating comprises a metal coating, preferably a metal oxide semiconductor coating.

According to another aspect of the present disclosure, there is described a method of manufacturing the aforesaid combined touch sensor and keypress sensor.

According to another aspect of the present disclosure, there is described a method of manufacturing the aforesaid printed circuit board.

According to another aspect of the present disclosure, there is described a method of manufacturing the aforesaid keyboard.

SLS

Preferably, the combined touch sensor and keypress sensor comprises a control unit for detecting and/or driving a signal for another component of the keyboard in dependence on a signal relating to the touch sensor electrodes.

Preferably, the other component comprises keypress sensor electrodes for detecting a depression of one or more keys of the keyboard.

Preferably, the control unit is arranged to drive the signal in relation to a frequency and/or time period of the signal of the touch sensor electrodes.

Preferably, the control unit is arranged to detect a signal in relation to the other component at a time not overlapping with a time of driving a signal for the touch sensor electrodes.

Preferably, the control unit is arranged to alternately detect a signal in relation to the other component and drive a signal in relation to the touch sensor electrodes.

Preferably, the control unit is arranged to detect a signal in relation to a row and/or column of the other component at a time not overlapping with a time of driving a signal for a corresponding row and/or column of the touch sensor electrodes.

Preferably, the control unit is arranged to alternately detect a signal in relation to a row and/or column of the other component and drive a signal in relation to a corresponding row and/or column of the touch sensor electrodes.

Preferably, the controller is arranged to alternately detect a signal in relation to a row and/or column of the other component and drive a signal in relation to a corresponding row and/or column of the touch sensor electrodes.

Preferably, the controller is arranged to: drive a signal to a line of the touch sensor electrodes at a first time, and detect a signal in another line of the touch sensor electrodes that depends on the driven signal; and detect a signal from a line of the other component at a second time, wherein the second time is different to the first time.

Preferably, the driven signal is arranged to induce and/or affect a signal in the other line of the touch sensor electrodes.

Preferably, the first time and the second time are selected so that the driven signal does not substantially affect a reading taken in relation to the line of the keypress sensor electrodes. Preferably, the first time and the second time are selected so that a current induced in the line of the other component by the driven signal is beneath a current threshold, preferably a threshold of 1 Amps, more preferably 0.1 Amps, yet more preferably 0.01 Amps, still more preferably 0.001 Amps.

Preferably, the first time and the second time are separated by at least 0.5 s, at least 0.1 s, at least 0.05 s, at least 0.01 s, at least 0.005 s, at least 0.001 s, at least 0.0005 s, and/or at least 0.0001 s.

Preferably, the controller is arranged to: drive a signal to a line of the touch sensor electrodes at a third time, and detect a signal in another line of the touch sensor electrodes that depends on the driven signal; and detect a signal from a line of the other component at a fourth time, wherein the second time is different to the first time.

Preferably, the difference between the third time and the first time is the same as the distance between the fourth time and the second time.

Preferably, the other component comprises an optical element and/or a backlight.

Preferably, the keyboard is arranged to drive a signal in relation to a further component in dependence on the signal relating to the touch sensor electrodes.

Preferably, the keyboard further comprises one or more buttons for executing a function of a pointer. Preferably, the buttons are separated from a/the touch sensor electrodes.

Preferably, the keyboard further comprises a controller for determining a mode of the keyboard.

Preferably, the touch sensor electrodes and the keypress sensor electrodes are provided in a single component, preferably a PCB component.

Preferably, the keycaps comprise transmittal mechanisms.

Preferably, the keycaps comprise a flexible and/or deformable material.

Preferably the keyboard comprises a first, preferably rigid, part and a second, preferably deformable, part, the first part comprising a/the touch sensor electrodes and the second part comprising a/the keycaps.

Preferably, the first part comprises the keypress sensor electrodes.

Preferably, the second part comprises a/the transmittal mechanisms. Preferably, the transmittal mechanisms are a part of the keycaps.

Method of manufacture According to another aspect of the present disclosure, there is described a keyboard comprising a touch sensor as aforesaid.

According to another aspect of the present disclosure, there is described a method of manufacturing a touch sensor as aforesaid.

According to another aspect of the present disclosure, there is described a method of manufacturing a keyboard as aforesaid.

According to another aspect of the present disclosure, there is described a method of manufacturing a touch sensor comprising forming a touch sensor. Preferably, the method comprises forming holes in the touch sensor.

According to another aspect of the present disclosure, there is described a method of manufacturing a keyboard comprising: providing a plurality of keys, wherein each of the keys comprises a keypress mechanism that is operated when the key is pressed; providing a base layer; and providing a keypress sensor layer for detecting the movement of the keys; wherein the keypress sensor layer is located between the base layer and the keypress mechanisms.

Preferably, forming the touch sensor comprises forming a grid of sensor elements. Preferably, forming the touch sensor comprises forming a grid of electrodes.

Preferably, forming the holes comprises forming the holes in dependence on the location of the sensor elements.

Preferably, the holes are formed so as to not overlap the edges of the sensor elements sensor elements.

Preferably, forming the holes comprises forming holes of different sizes.

Preferably, the method further comprises affixing one or more transmittal mechanisms to the touch sensor.

According to another aspect of the present disclosure, there is described a method of manufacturing a keyboard comprising a base plate and a touch sensor.

Preferably, the method comprise adding an adhesive layer to the base plate and/or the touch sensor.

Preferably, the method comprises heating the base plate and/or the touch sensor.

Preferably, the method comprises removing air bubbles from the touch sensor.

Preferably, the method comprises pressing together two or more layers of the keyboard.

Preferably, the method comprises passing an attachment mechanism through a hole in the touch sensor.

Preferably, the method comprises passing an attachment mechanism through the hole so as to mount a/the keypress mechanism of the keyboard on the base plate of the keyboard.

Preferably, the method comprises mounting one or more keypress mechanisms to a component of the keyboard, preferably mounting one or more keypress mechanisms to the base plate and/or a mechanism mounting plate.

Preferably, the method comprises attaching one or more keycaps to the keypress mechanisms.

Preferably, the method comprises aligning the keycaps with the transmittal mechanisms.

Preferably, the method comprises aligning a backlight with at least a subset of the holes of the touch sensor.

Preferably, the method comprises forming a key plate comprising a plurality of keys.

According to another aspect of the present disclosure, there is described a method of manufacturing a key plate comprising a plurality of keys.

Preferably, the method comprises forming a key plate comprising a plurality of integral keys.

Preferably, the method comprises cutting a key plate so as to form a plurality of keys.

Preferably, the method comprises engraving characters on one or more keys.

Preferably, the method comprises transferring calibration information to the keyboard, the calibration information being associated with the touch sensor.

According to another aspect of the present disclosure, there is described a method of manufacturing the aforesaid keyboard.

According to another aspect of the present disclosure, there is described a method of using the aforesaid keyboard.

Any feature in one aspect of the disclosure may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly.

Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the disclosure can be implemented and/or supplied and/or used independently.

The disclosure also provides a computer program and a computer program product comprising software code adapted, when executed on a data processing apparatus, to perform any of the methods described herein, including any or all of their component steps.

The disclosure also provides a computer program and a computer program product comprising software code which, when executed on a data processing apparatus, comprises any of the apparatus features described herein.

The disclosure also provides a computer program and a computer program product having an operating system which supports a computer program for carrying out any of the methods described herein and/or for embodying any of the apparatus features described herein.

The disclosure also provides a computer readable medium having stored thereon the computer program as aforesaid.

The disclosure also provides a signal carrying the computer program as aforesaid, and a method of transmitting such a signal.

Where the disclosure references the keyboard being arranged to operate in a certain way, this may comprise the control unit being arranged to operate in a certain way (and vice versa).

As used herein, a touch of the user may refer to a touch of the user using an appendage of the user (e.g. a finger). Equally, a touch of the user may refer to a touch of the user using an implement, such as a stylus.

The disclosure extends to methods and/or apparatus substantially as herein described with reference to the accompanying drawings.

The disclosure will now be described, by way of example, with reference to the accompanying drawings.

DESCRIPTION OF THE DRAWINGS

FIG. 23 shows a side view of an exemplary embodiment of a combined touch sensor and keypress sensor.

DESCRIPTION OF THE PREFERRED EMBODIMENTS

Figure 1:
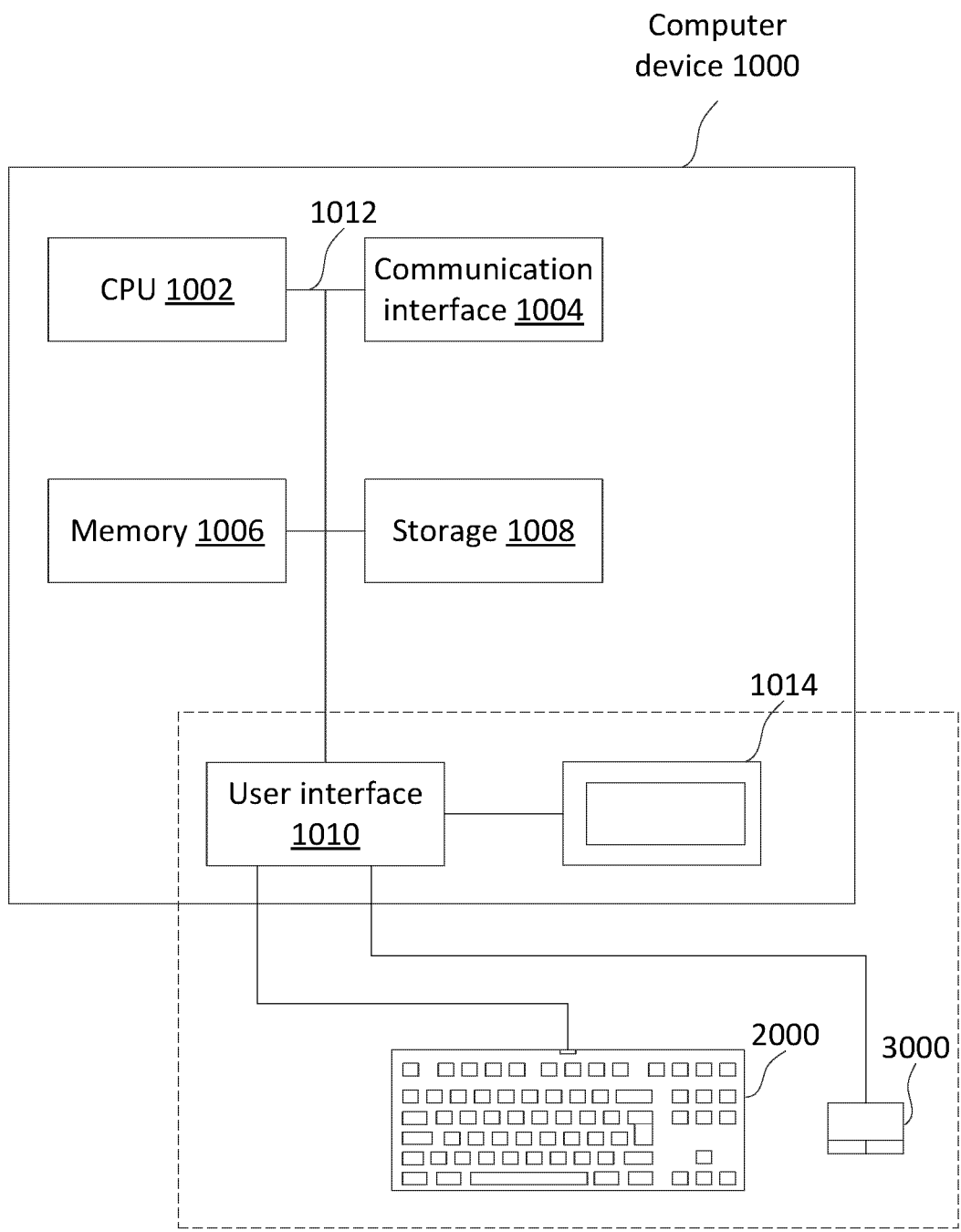
FIG. 1 shows an exemplary user device with which the apparatus described herein may be used.

Referring to FIG. 1, there is shown an exemplary computer device 1000.

The computer device 1000 comprises a processor in the form of a CPU 1002, a communication interface 1004, a memory 1006, storage 1008, and a user interface 1010, where the components are connected by a bus 1012. The user interface 1010 typically comprises a display 1016 and one or more input/output devices; in this embodiment the user interface 1010 comprises a keyboard 2000 and a pointer input 3000.

The CPU 1002 executes instructions, including instructions stored in the memory 1006 and the storage 1008.

The communication interface 1004 is typically a Bluetooth® interface that enables the computer device 1000 to be coupled with other devices comprising a Bluetooth® interface. It will be appreciated that the communication interface 1004 may comprise any other communications technology, such as an area network interface and/or an Ethernet interface. The communication interface 1004 may comprise a wireless interface or a wired interface, such as a universal serial bus (USB) interface.

The memory 1006 stores instructions and other information for use by the CPU 1002. Typically, the memory usually comprises both Random Access Memory (RAM) and Read Only Memory (ROM).

The storage 1008 provides mass storage for the computer device 1000. Depending on the computer device, the storage is typically an integral storage device in the form of a hard disk device, a flash memory or some other similar solid state memory device, or an array of such devices.

The user interface 1012, and in particular the keyboard 2000 and the pointer input 3000 are used to control the computer device 1000, where these components enable the user to pass instructions to the CPU 1002. Typically, the pointer input comprises a touch sensor and/or a computer mouse.

The keyboard 2000 and the pointer input 3000 may be integrated with the computer device 1000 or may be removable components. For example, the keyboard and the pointer input may be connected to the computer device 1000 by an, optionally removable, wire, such as a USB connection. The pointer input may comprise a touchpad.

In some embodiments, the keyboard 2000 and/or the pointer input 3000 is wirelessly connected to the computer device 1000, for example using a Bluetooth® connection.

The present disclosure relates, in part, to a combined keyboard and pointer input, where a pointer input means (e.g. a touchpad) is integrated with the keyboard 2000. As an example, a capacitive sensor may be integrated with the keyboard, where the capacitive sensor detects when the user touches the keys of the keyboard.

It will be appreciated that as well as capacitive sensors other technologies can be used to detect a user touching the keys of the keyboard 2000. As an example, optical sensors may be used, where these optical sensors may detect movement of an object a certain distance from the keyboard and/or the pointer input 3000. Similarly, pressure sensors may be used, where the pressure sensors may be included in the keys of the keyboard or placed above/below the keys. In various embodiments, the touch sensor comprises one or more of: a camera; acoustic sensors; temperature sensors; magnetic sensors (e.g. Hall sensors); piezoelectric sensors; and triboelectric sensors.

Figure 2:
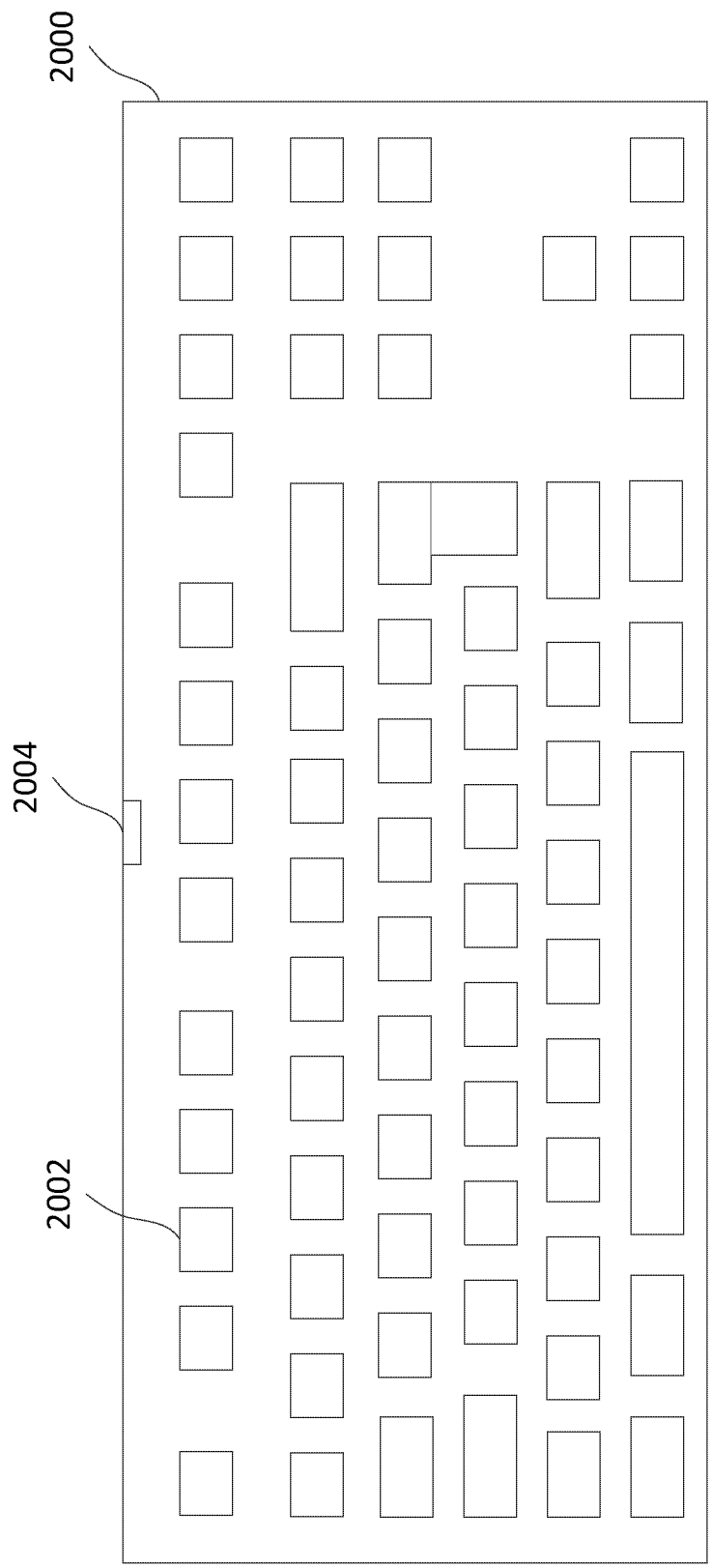
FIG. 2 shows a keyboard.

Referring to FIG. 2, the keyboard 2000 is shown in more detail.

The keyboard 2000 comprises a number of keys 2002 and a connection interface 2004. The keys are arranged to detect a user input, e.g. from a user pressing the keys. The connection interface is arranged to connect the keyboard to the computer device 1000. The connection interface may comprise a USB connection, a Bluetooth® interface, or a radio interface (e.g. at 2.4 GHz or 5 GHz).

In some embodiments, the keyboard 2000 comprises a computer device and/or comprises components similar to the computer device 1000. In particular, the keyboard may comprise a processor, a communication interface, a memory, storage, and/or a user interface. This enables the keyboard to execute instructions itself (without requiring the assistance of a separate computer device).

It will be appreciated that any layout of keyboard may be used; for example, a full-size keyboard, a 'tenkeyless' keyboard, or a '60%' keyboard. Furthermore, the layout and properties of the keys 2002 on the keyboard 2000 may vary.

Figure 3:
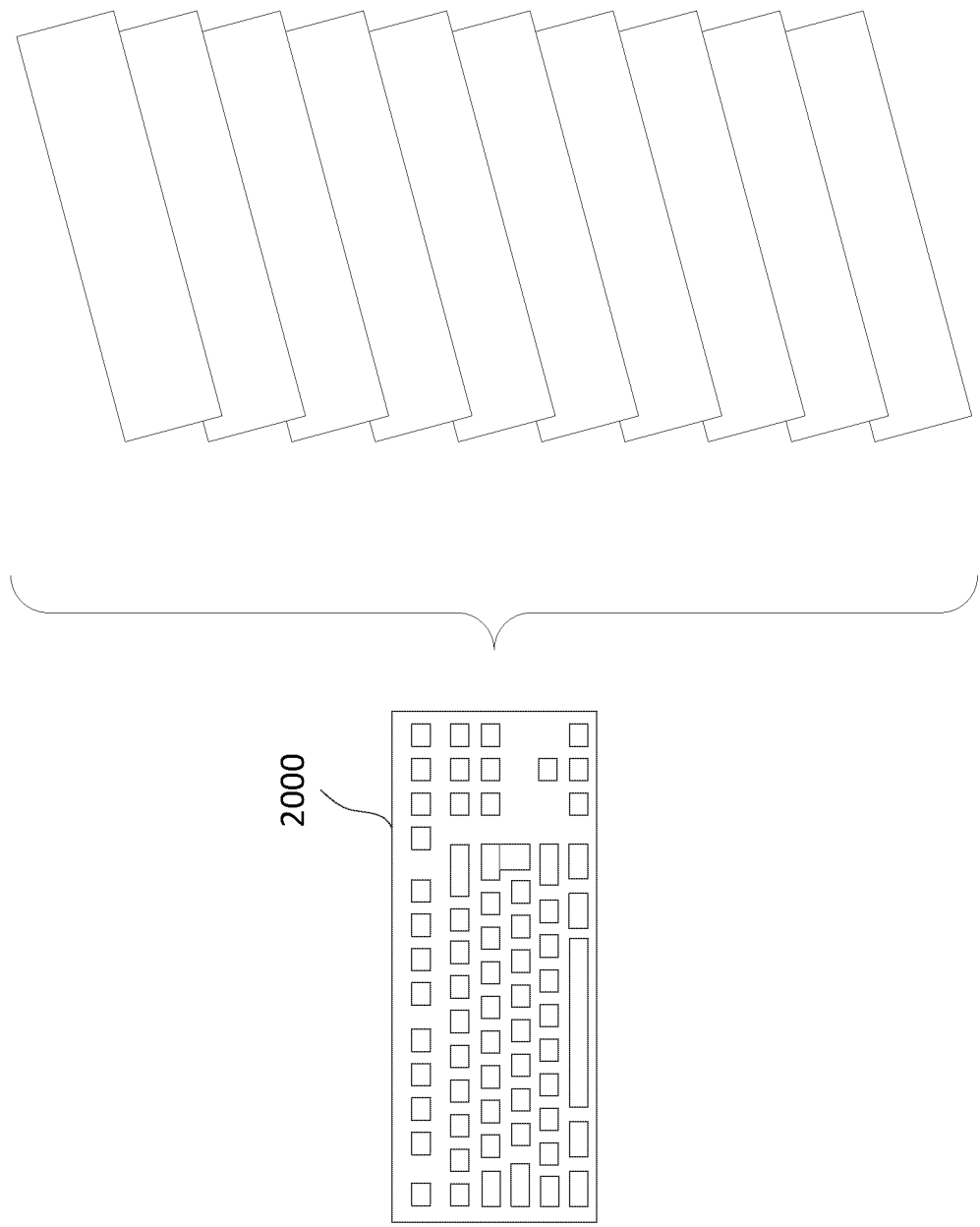
FIG. 3 shows layers of the keyboard.

Referring to FIG. 3, the keyboard 2000 is typically composed of a plurality of layers.

Certain layers that may form a part of the keyboard 2000 are described with reference to FIGS. 4 and 5*a*-5*d*.

Figure 4:
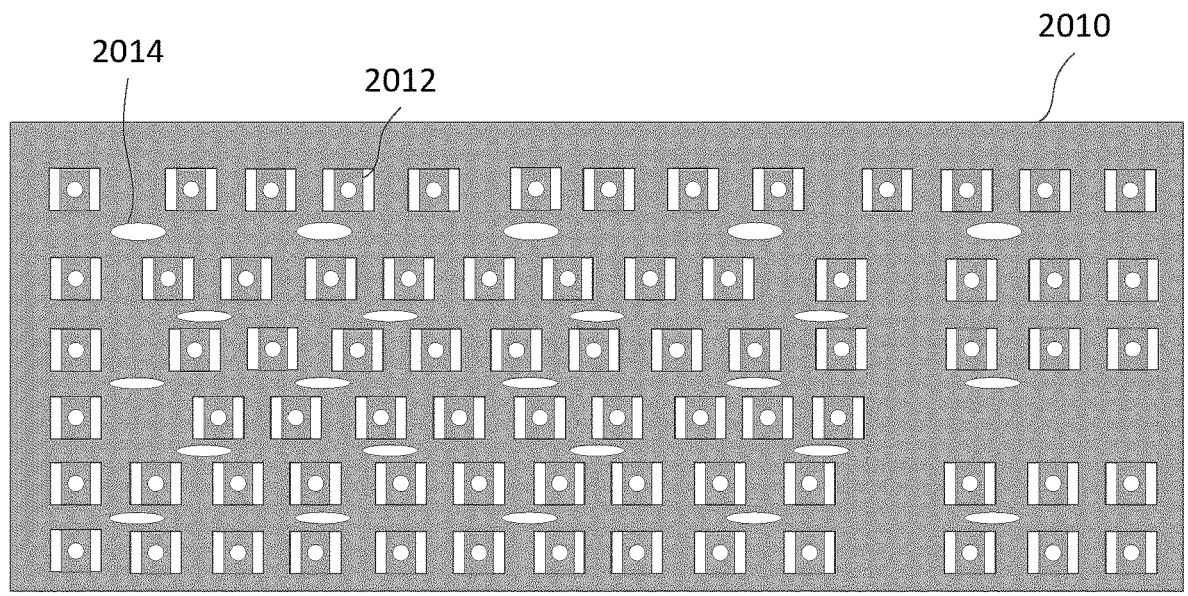
FIG. 4 shows a base plate that may be included in the keyboard.

In particular, referring to FIG. 4, there is disclosed a base plate 2010, which comprises a plurality of hook mounts 2012. The hook mounts of the base plate are arranged to pass through each other layer of the keyboard in order to attach to a keypress mechanism, such as a scissor mechanism. Various other keypress mechanisms are known in the art (e.g. a number of alternate keypress mechanisms are described in WO 2021/094600 A1).

The keyboard 2000 may also comprise a touch sensor (which touch sensor is typically a part of a touch sensor layer); this touch sensor is typically arranged to allow passage of the hook mounts 2012, e.g. by the touch sensor comprising holes through which the hook mounts can pass.

The hook mounts 2012 typically comprise extensions, which are designed to pass through the other layers in order to fit inside recesses of another layer. Alternatively, the hook mounts may comprise recesses, into which extensions of another layer are arranged to fit.

In some embodiments, the base plate 2010 comprises holes 2014 to allow the passage of light. This allows a backlight to be located behind the base plate, where this backlight is able to provide a light that passes through the holes of the base plate.

The base plate 2010 is typically a rigid structure that is typically formed of metal; this provides rigidity to the entire keyboard 2000.

Referring to FIGS. 5*a*-5*d*, there are described other layers that may form a part of the keyboard 2000.

Figure 5A:
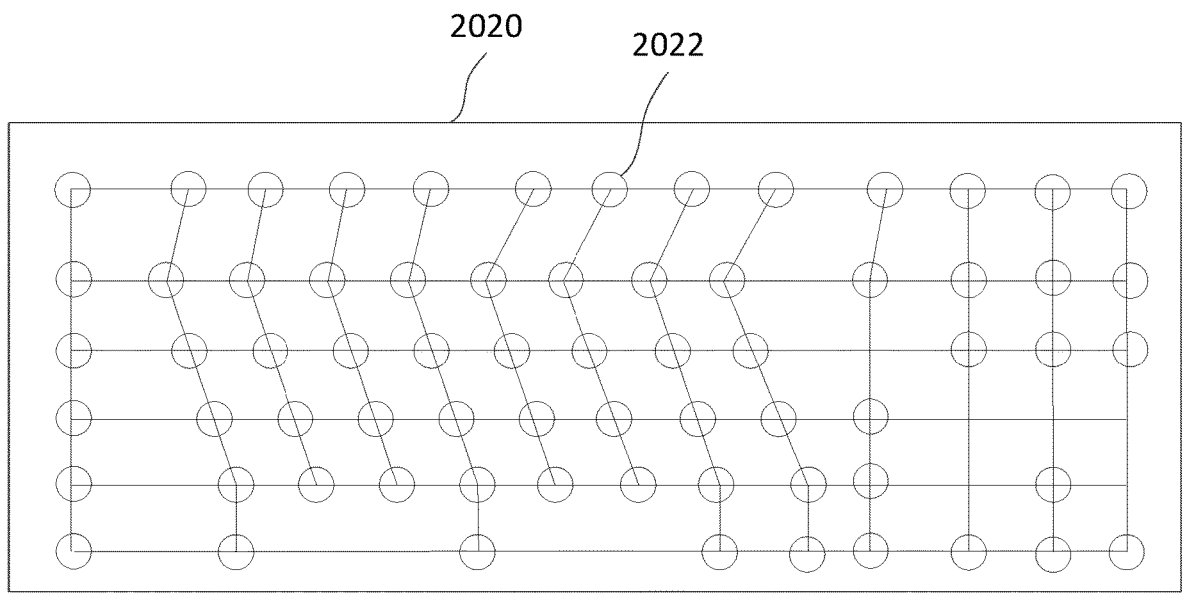
FIG. 5*a*-5*d* show further layers of the keyboard that may be included in the keyboard.

Referring to FIG. 5*a*, there is shown a keypress sensor layer 2020. The keypress sensor layer is arranged to record keystrokes, e.g. when a user presses one of the keys 2002. Typically, this recording is achieved by arranging a plurality of sensors 2022 on the keypress sensor layer, where each sensor is arranged to detect the pressing of a single key.

In some embodiments, the keyboard 2000 is a membrane keyboard. In such embodiments, the keypress sensor layer 2020 comprises a series of conductive portions with there being two conductive portions between each key. A further conductive portion is present at the base of the keys, so that when a key is pressed two conductive portions of the keyboard sensor layer are connected.

In order to determine a keypress, the keyboard 2000 typically comprises a control unit (not shown) that continuously scans the keypress sensor layer 2020 in order to determine the presence of a current. In various embodiments, the scan rate and the scan pattern of the controller differ; e.g. a higher scan rate of the controller may be desirable to reduce the latency of a keypress, but this may reduce accuracy by being more likely to pick up a false keypress.

In some embodiments, the keyboard 2000 is a mechanical keyboard and each key is connected to a separate switch. Pressing a key operates the corresponding switch, thereby a keypress can be detected.

Typically, the keyboard 2000 is a membrane keyboard and the keypress sensor layer 2020 is formed by bonding together one or more polyethylene terephthalate (PET) membranes. The plurality of keypress sensors (e.g. conductive portions) are located within the PET membranes.

Figure 5B:
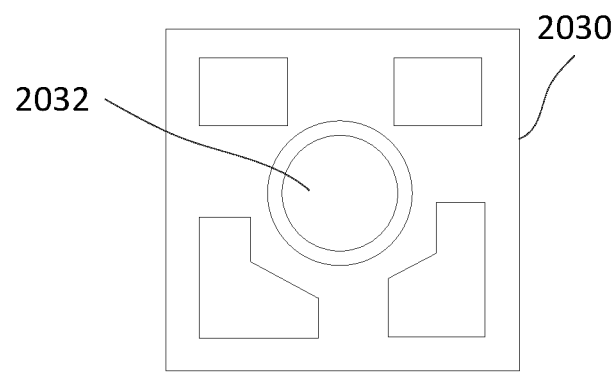
Figure 5C:
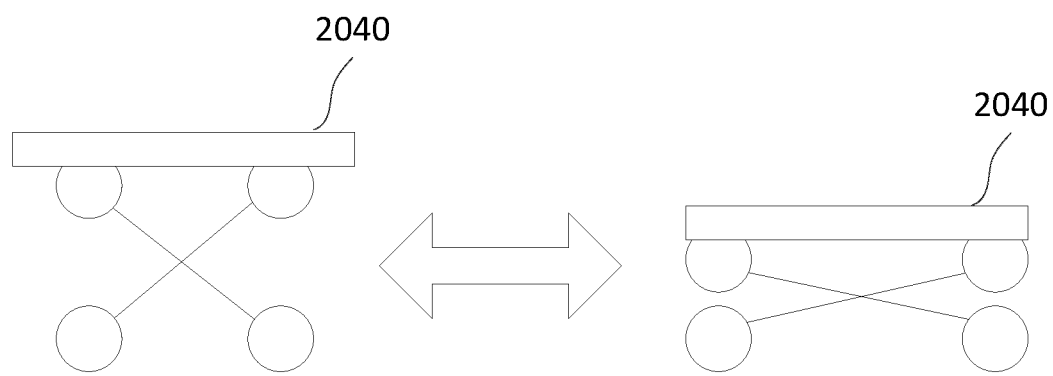
Figure 5D:
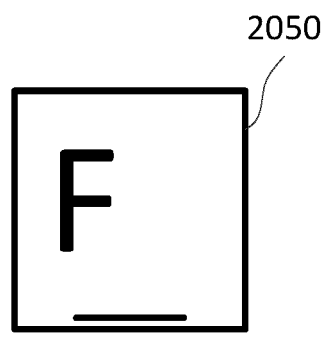

Referring to FIGS. 5*b*-5*d*, each key 2002 typically comprises a transmittal mechanism 2030, a keypress mechanism 2040, and a keycap 2050. The keycap enables the user to interact with the remainder of the key; the transmittal mechanism enables the keycap to interact with the keypress sensor layer 2020 so that a keypress can be detected; the keypress mechanism is an optional feature of the key that is arranged to provide a stable keypress (e.g. ensure that the force resisting a keypress is relatively constant throughout the distance of travel of the key).

The keypress mechanism 2040 also maintains the horizontal position of the keycap 2050 throughout the travel of the key to ensure that the keycap being pressed (at any location on the keycap) results in a depression of the transmittal mechanism 2030.

Typically, the transmittal mechanisms 2030 are mounted on the touch sensor layer 2020. In some embodiments, the transmittal mechanisms are arranged so that the depression of a keycap results in a part of a corresponding transmittal mechanism impacting the touch sensor layer 2020. In some embodiments, the transmittal mechanisms are arranged so that the depression of the keycap 2050 results in a part of a corresponding transmittal mechanism passing through a hole of the touch sensor layer.

Referring to FIG. 5b, there is shown an embodiment of a transmittal mechanisms 2030. In this embodiment, the transmittal mechanism comprises a silicone dome 2032, where there is typically a transmittal mechanism (a silicone dome) associated with each key of the keyboard 2000. The silicone domes are arranged so that when the user presses a key of the keyboard 2000 a corresponding silicone dome is compressed, and this dome actuates a sensor 2022 of the keypress sensor layer 2020. The sensor is thus able to detect that a key has been pressed. The transmittal mechanisms (e.g. the silicone domes) also cushion the depression of the keys 2002 and provide a return force that raises a key once the user has released pressure on that key.

It will be appreciated that there are a number of other types of transmittal mechanisms may be used to detect the depression of a key, such as metal domes or mechanical linkages (e.g. push switches and/or springs).

Referring to FIG. 5c, there is shown an embodiment of the keypress mechanism 2040, in this embodiment of the keypress mechanism is a scissor mechanism. The scissor mechanism comprises two interlocking parts that are typically composed of plastic. The interlocking parts are arranged to bias the key 2002 towards a raised position and/or to resist the depression of the key. When the user applies pressure to the key, the key is depressed, which forces the base of each interlocking part away from the base of the other interlocking part so that the key can be depressed. When the user releases the pressure, the biasing force acts to raise the key. This movement is shown in FIG. 5c.

Referring to FIG. 5d, there is shown a keycap 2050. The keycap is placed on top of the transmittal mechanism and the keypress mechanism 2040 so that pressure applied to the keycap is transmitted to the transmittal mechanism 2030 and the keypress mechanism. The keycap protects the remainder of the layers to minimise wear and increase the lifespan and usability of the keyboard 2000. Typically, each keycap has a different symbol printed onto it, e.g. a letter or a number, to enable the user to determine the consequence of depressing the keycap (e.g. depressing a keycap that has "F" printed on it will result in the letter f being typed and shown on the display 1012).

The keypress mechanisms 2040 are mounted on a layer of the keyboard 2000, which may be a separate layer to those described above. In typical keyboards the keypress mechanisms are mounted to a layer that is located towards the top of the keyboard, e.g. the keypress mechanisms may be mounted to a layer immediately below the level of the keycaps 2050.

The present disclosure considers, in part, a keyboard in which the hook mounts 2012 on which the keypress mechanisms 2040 are mounted are a part of the base plate 2010. Each other layer of the keyboard 2000 is arranged so that the hook mounts are able to pass through these layers in order to attach to the keypress mechanisms; in particular, a touch sensor layer is arranged to enable the passage of the hook mounts. The base plate 2010 therefore provides both rigidity for the keyboard and a mounting means for the keypress mechanisms.

This enables each keypress mechanism to be secured without the need for a separate securing layer, which allows the provision of a thin keyboard.

Touch Sensor

Figure 6A:
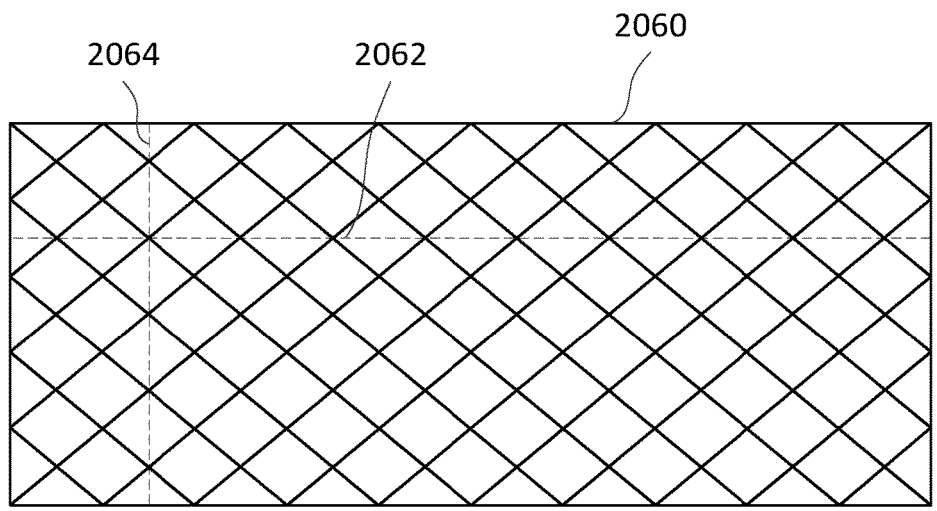
FIG. 6*a* shows a touch sensor that can be used with the keyboard.

Referring to FIG. 6a, there is shown a touch sensor in the form of a touch sensor layer 2060 that is suitable for inclusion within the keyboard 2000. The touch sensor layer is arranged to detect the presence of an object on or above the keyboard. Typically, this detection is achieved by the touch sensor layer comprising a plurality of sensing elements. In this embodiment, the touch sensor layer comprises a capacitive sensor that is capable of detecting a user's finger touching the keyboard due to a change in the local electric field caused by the finger. Typically, the touch sensor layer is arranged to determine one or more of: a number of objects above the keyboard, a position of those objects, a motion of those objects, a trajectory of those objects, and/or a speed of those objects.

Figure 8:
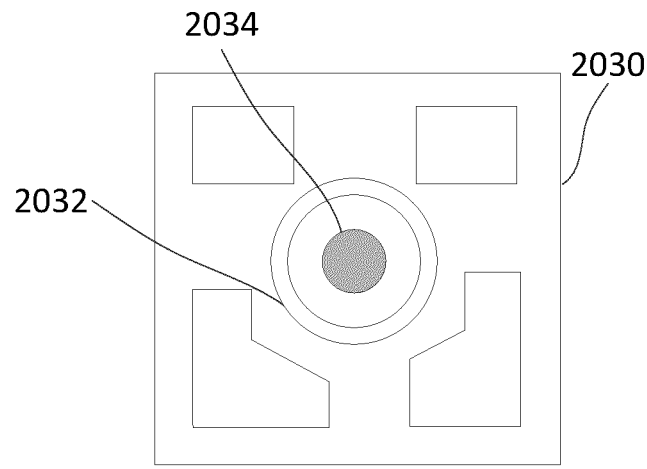
FIG. 8 shows a transmittal mechanism for use in detecting a keypress.

In some embodiments, the touch sensor layer 2060 comprises other sensors, such as optical sensors, pressure sensors, accelerometers, or audio sensors. Generally, the touch sensor layer may comprise any sensor and/or component that is capable of detecting the position and/or movement of a user and/or object.

Where a capacitive sensor is used the capacitive sensor typically comprises a grid formed of rows 2062 and columns 2064 of electrodes. A controller is arranged to drive a current through a single row of the touch sensor layer 2060 and then to scan (in order) each column of the touch sensor layer for an induced current; this process is repeated for each row. The current induced in a given column will depend on whether a user (e.g. a user's finger) is near the row being driven. With a mutual capacitance sensor, the capacitance value at each intersection can be evaluated separately so that the sensing of multiple touch points is possible. Other capacitive sensors, such as self-capacitance sensors, may also be used—for some of these sensors, detection of multiple touch points may not be possible. A more detailed view of a capacitive touch sensor is described below with reference to FIGS. 8a-8c. More generally, any grid of sensor elements may be used to detect a touch input, e.g. a grid of pressure sensors or optical elements may be used.

In this embodiment, there is provided a capacitive sensor with rows and columns arranged in a diamond formation as shown in FIG. 6a, where the separations between the rows 2062 and the columns 2064 of the capacitive sensor are at an angle compared to the edges of the keyboard 2000. Other arrangements may be used, e.g. a comb arrangement where the separations between the rows and columns of electrodes are parallel to the edges of the keyboard.

In order to sense the presence of an object, the touch sensor layer 2060 may be located near the top of the keyboard, e.g. immediately beneath the keypress mechanisms 2040 or the transmittal mechanisms 2030. Proximity to the keycaps 2050 enables simple sensing of a user's touch on the keycaps. In order to amplify the capacitive effect of the user's touch on the keycaps, there may be provided a conductive material on the keycaps or an electrical connection between the keycaps and the touch sensor layer. The use of a conductive material may be particularly beneficial when the touch sensor layer is distant from the keycaps.

Typically, the touch sensor layer 2060 is located above the keypress sensor layer 2020 and below the level of the keypress mechanisms 2040; this arrangement places the touch sensor layer close enough to the top of the keyboard 2000 to detect the touch of a user on the keycaps 2050 of the keyboard while enabling the touch sensor layer to be provided as a single plate (since the touch sensor layer does not need to move due to a movement of the keycaps. More generally, the touch sensor layer is typically located below the layer of the keypress mechanisms so as to allow provision of the touch sensor layer as a single plate.

In some embodiments, the touch sensor layer 2060 comprises holes that enable the passage of the hook mounts 2012 of the base plate 2010; this enables the hook mounts (or a component that can be secured to the hook mounts) to pass through the touch sensor layer so that the keypress mechanisms 2040 can be secured to the hook mounts.

Where the touch sensor layer 2060 is provided above the keypress sensor layer 2020, the keypress sensor layer may be arranged to detect the depression of the transmittal mechanisms 2030 through the touch sensor layer. As an example, the depression of the transmittal mechanisms may apply a pressure to the touch sensor layer that results in the depression of the portion of the touch sensor layer directly beneath the pressed key; this depression of the touch sensor layer is detected by a sensor 2022 of the keypress sensor layer.

In some embodiments, there are provided holes in the touch sensor layer 2060 to enable the transmittal mechanisms 2030 (or a part of the transmittal mechanisms) to pass through the touch sensor layer so as to actuate the sensors 2022 of the keypress sensor layer 2020.

The holes in the touch sensor layer 2060 are typically arranged so that they do not overlap with any intersections of the rows 2062 and columns 2064 of electrodes of the touch sensor layer. For example, the touch sensor layer may comprise one or more holes located entirely between the diagonal separation lines of electrodes of the touch sensor layer. This is described in more detail below with reference to FIGS. 8a-8c.

Figure 6B:
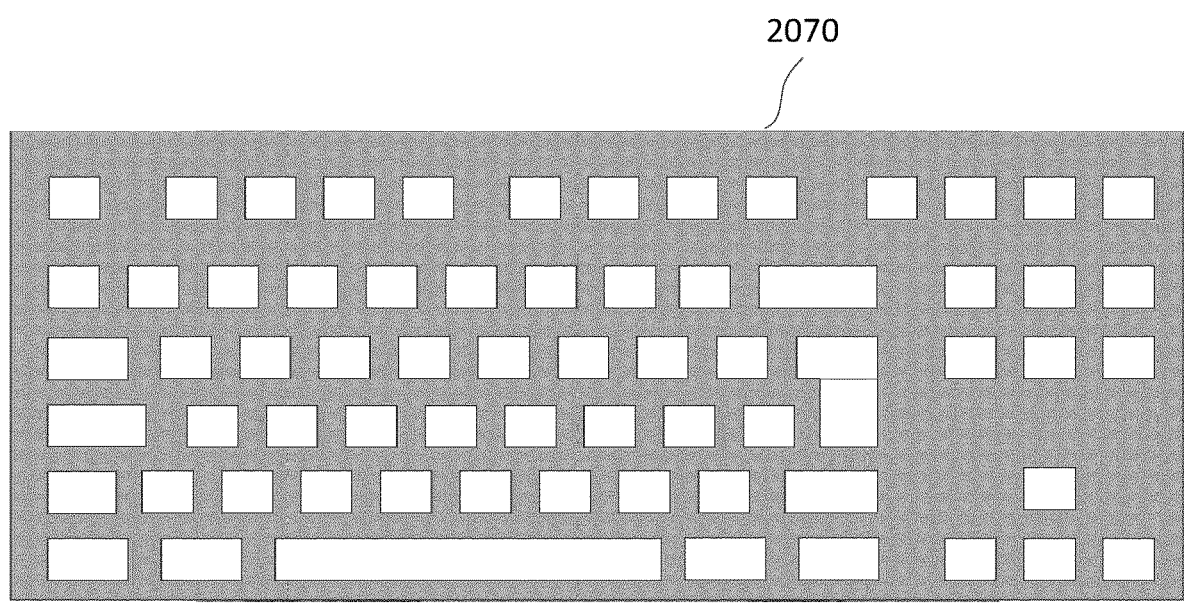
FIG. 6*b* shows a protective layer for protecting the touch sensor of FIG. 6*a*.

Referring to FIG. 6b, where the touch sensor layer 2060 is provided, a protective layer 2070 may be provided to protect the touch sensor layer from dust and moisture. The protective layer is typically made of a plastic material and/or a thin film.

The protective layer 2070 is typically located above the touch sensor layer 2060. Like the touch sensor layer, the protective layer may comprise holes so as to allow the passage of transmittal mechanisms 2030. The keypress mechanisms 2040 may then be mounted on the protective layer. In this situation, the touch sensor layer and the protective layer may be considered to be a single combined touch sensor/touch sensor layer (so that the transmittal mechanisms being mounted on the protective layer effectively involves the transmittal mechanisms being mounted on a touch sensor).

More generally, each layer of the keyboard 2000, and/or each layer between the base layer 2010 and the keypress mechanisms 2040 may comprise holes. Typically, each layer comprises concentric holes so that the hook mounts 2012 (or a light from a backlight) can pass through each layer.

In some embodiments, a backlight is provided so that a user can easily use the keyboard 2000 without an external light source. In these embodiments, there is typically a light guide layer (not shown) included in the keyboard, which light guide layer directs the lights to pass through the keycaps 2050 of the keyboard. In these embodiments, the protective layer 2070 may be transparent or comprise transparent portions.

Typically, the light guide layer and/or the optical elements that provide light for the backlight are placed either at the base of the keyboard (beneath the base plate 2010); above the touch sensor layer 2060; in or on the touch sensor layer (e.g. so that the backlight is integrated with the touch sensor/touch sensor layer); or above the protective layer 2070.

Each layer is typically secured to the other layers with an adhesive layer, e.g. a layer of glue or an adhesive tape (e.g. a double sided adhesive tape). Securing the layers together ensures that the rigid base plate 2010 is able to provide rigidity to the remainder of the layers.

The hook mounts 2012 are arranged to pass through the touch sensor layer 2060 and the protective layer 2070 in order to secure the keypress mechanisms 2040; this also provides rigidity to the intervening layers.

While it will be appreciated that the layers of the keyboard 2000 may be arranged in any order—and any combination of layers may be provided and/or removed—a preferred arrangement of the layers is as follows:

1. (optionally) The light guide layer (not shown).
2. The base plate 2010.
3. (optionally) A layer of adhesive.
4. The keypress sensor layer 2020.
5. (optionally) A layer of adhesive.
6. The touch sensor layer 2060.
7. (optionally) A layer of adhesive.
8. (optionally) The protective layer 2070.
9. The transmittal mechanisms 2030.
10. The keypress mechanisms 2040.
11. The keycaps 2050.

As has been described above, typically the base layer 2010 comprises hook mounts 2012 that pass through each of the layers between the base plate and the keypress mechanisms 2040 (including the touch sensor layer 2060).

As has been described above, the transmittal mechanisms 2030 may be arranged to pass through the other layers so as to be able to actuate the sensors 2022 of the keypress sensor layer 2020.

Furthermore, the transmittal mechanisms 2030 may pass through, or be located internally to, the keypress mechanisms 2040, so that the keypress mechanisms are effectively adjacent to the protective layer 2070.

Typically, the transmittal mechanisms 2030 (e.g. silicone domes) are mounted on the touch sensor layer 2060, where the depression of the transmittal mechanism may result in a part of the transmittal mechanism passing through a hole of the touch sensor layer.

Typically, a ground layer is located between the keypress sensor layer 2020 and the touch sensor layer 2060; for example, directly above the keypress sensor layer. This ground layer is arranged to prevent interference between the keypress sensor layer and the touch sensor layer.

There is disclosed herein a method of detecting keypresses using the touch sensor layer 2060. In these embodiments, the keyboard 2000 may be provided without the keypress sensor layer.

In these embodiments, and other embodiments, the keyboard 2000 may be provided without the base plate 2010.

Where the keyboard is provided without the base plate in particular (but also where the keyboard has the base plate), the touch sensor layer 2060 may be provided as a rigid layer that provides rigidity to the keyboard; for example, the touch sensor layer may comprise an FR4 material.

In some embodiments, the keyboard 2000 comprises (optionally, only):

1. A touch sensor layer 2060, which may also be used to detect keypresses, as is described further below.
2. Keycaps 2050.

In such embodiments, the keycaps 2050 may perform certain functions of the transmittal mechanisms 2030 and the protective layer 2070 (e.g. the operation of the touch sensors). Typically, such embodiments further comprise keypress mechanisms 2040 between the touch sensor layer 2060 and the keycaps. As is described further below, these keypress mechanisms 2040 may also provide some of the functionality that is conventionally provided by the transmittal mechanisms.

In these embodiments in particular, the keycaps 2050 may each be associated with (e.g. comprise) a conductive and/or metal element. In particular, there may be a metal coating arranged on or in the keycaps (e.g. embedded in layers of silicon). In a preferred embodiment, there are metal elements (e.g. embedded in layers of silicon) located on each corner of some or all of the keycaps. This aids in the detection of a keypress by the keypress sensor layer 2020 (where a keypress sensor layer is used) and/or the touch sensor layer 2060 (as is described further below).

Where a keypress sensor layer 2020 is provided, this layer may be provided in combination with the touch sensor layer 2060 (e.g. in a combined printed circuit board (PCB) layer).

As has been explained with reference to FIG. 5*a*, keypresses can be detected using a keypress sensor layer that contains a number of sensors to detect the pressing of a key.

An aspect of the present disclosure relates to instead (or additionally) determining keypresses using the touch sensor layer 2060. In particular, where the touch sensor layer 2060 comprises a capacitive sensor, the transmittal mechanism 2030 may be arranged so that pressing the key 2002 results in a change in the local electric field near the touch sensor layer.

Figure 9:
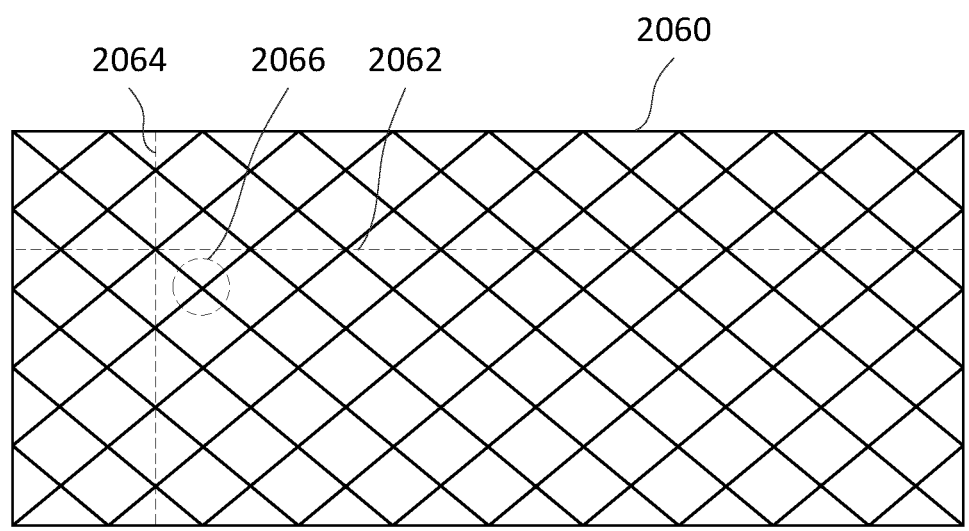
FIG. 9 shows a capacitive sensor suitable for use with the transmittal mechanism of FIG. 8.

As shown in FIG. 9, one way of implementing, or assisting, this determining is by attaching a coating 2034, e.g. a metal coating, to the transmittal mechanisms 2030 and/or the base of the keys 2002 so that when a key is pressed a corresponding coating approaches and/or contacts an electrode of the touch sensor layer 2060. This presence of the coating results in a determinable alteration of the local electric field beneath the pressed key. This alteration can be detected using the touch sensor layer.

In various embodiments, the coating 2034 comprises one or more of: a metal coating, an electrically conductive coating, a metal oxide semiconductor coating, and an electrically insulating coating. Typically, the coating is arranged to cause a greater alteration to the local electric filed than the presence of a user's finger alone (e.g. an alteration at least twice the alteration due to a user's finger).

The coating 2034 may be located on any component that moves when the keycap 2050 is depressed. Typically, the coating is located on the keycap (e.g. on the underside of the keycap) and/or on the transmittal mechanism 2030 (e.g. on the exterior of the silicone dome 2032 or on the interior of the silicone dome). In other words, the coating 2034 is arranged so that the coating is moved when the keycap is pressed.

In order to increase the sensitivity of the touch sensor layer 2060 and improve the detection of keypresses, in some embodiments the touch sensor layer is arranged so that the coating 2034 on the transmittal mechanism 2030 is located above an intersection of the rows and columns of the touch sensor layer. This is illustrated in FIG. 9, which shows an exemplary contact point 2066 (or a nearest approach point) on the touch sensor layer 2060. This contact point is arranged to be located beneath the coating of a key 2002 of the keyboard 2000 so that when the key is depressed, the coating approaches the contact point.

In some embodiments, the transmittal mechanism 2030 and/or the coating 2034 is located above the centre of a sensor of the touch sensor layer 2060 (e.g. to be at the centre of an electrode). In some embodiments, the transmittal mechanism and/or the coating of one or more keys is arranged to be at the intersection of a row of electrodes and a column of electrodes (e.g. the point at which the necks of two electrodes overlap).

By using the touch sensor layer 2060 to detect keypresses, the keyboard 2000 can be provided without the (separate) keypress sensor layer 2020. This enables the provision of a thin keyboard that is useable both for typing and as a touchpad. This also enables the provision of the touch sensor layer without holes to enable the passage of the transmittal mechanisms 2030. The lack of a need to provide holes in the touch sensor layer can simplify manufacture of the touch sensor layer.

In some embodiments, and in particular in embodiments where keypresses are detected using the touch sensor layer 2060, the touch sensor layer comprises optical elements (e.g. LEDs) arranged to provide a backlight. Where keypresses are detected using the touch sensor layer, holes in the touch sensor layer for the transmittal mechanisms 2030 are not required; the optical elements may then replace these holes (e.g. so that the optical elements do not overlap with any edges of touch sensor elements). More generally, optical elements may be located on the touch sensor layer based on the same sets of conditions for the placing of the holes. There may be provided a touch sensor layer that comprises both holes and optical elements, wherein the locating of the optical elements and the holes is based on the same sets of conditions.

While the detection of a keypress has been described with reference to a capacitive touch sensor, it will be appreciated that such detection is possible with other sensing mechanisms. As an example, a pressure sensor may be used to detect both touches and keypresses, where a light pressure placed on the keys 2002 is indicative of a user providing a touch/pointer input and a heavy pressure placed on the keys (e.g. a keypress) is indicative of a keystroke input.

Exemplary keyboard constructions where the touch sensor layer 2060 is used to detect keypresses are as follows:
1. The base plate 2010.
2. (optionally) A layer of adhesive.
3. The touch sensor layer 2060.
4. (optionally) The protective layer 2070.
5. The transmittal mechanism 2030.
6. The keypress mechanisms 2040.
7. The keycaps 2050.

and
1. The base plate 2010.
2. (optionally) A layer of adhesive.
3. The touch sensor layer 2060.
4. (optionally) The protective layer 2070.
5. The transmittal mechanism 2030.
6. The keypress mechanism mounting layer (not shown).
7. The keypress mechanisms 2040.
8. The keycaps 2050.

Touch Sensor Layer

The touch sensor layer 2060 may be any layer that is capable of detecting the position of the finger of a user. The touch sensor layer may comprise optical sensors, pressure sensors, self-capacitive sensors, and/or mutual capacitance sensors. While the touch sensor layer is typically described as sensing a touch on the keys of the keyboard 2000, the touch sensor layer may also be arranged to sense an object proximate to the touch sensor layer, where this object may move above the keys 2002 of the keyboard.

Figure 7:
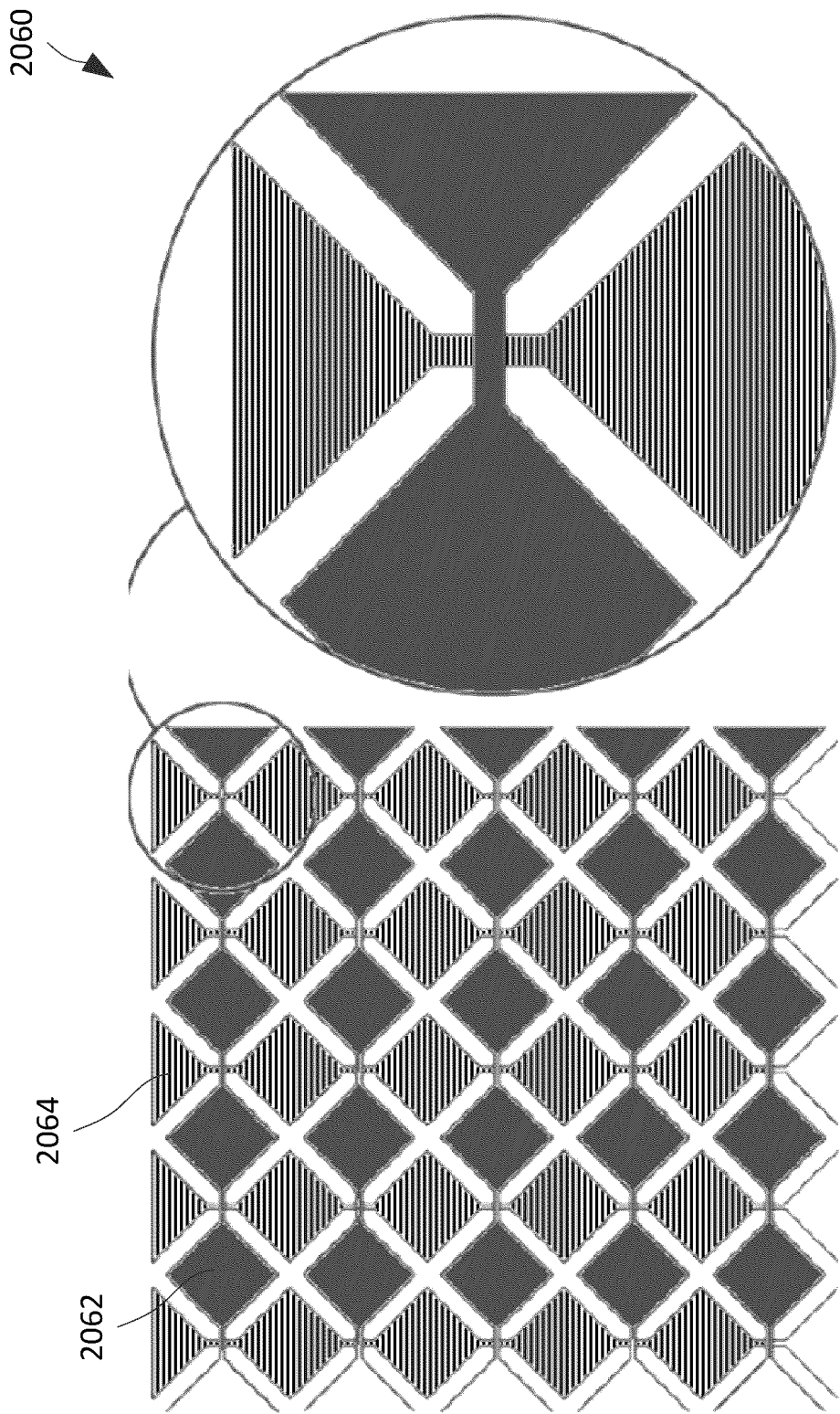
FIG. 7 shows a detailed example of a touch sensor.

As shown in FIG. 6a and, in more detail, in FIG. 7 the touch sensor layer 2060 typically comprises a matrix of electrodes that is used to provide a projected capacitive keyboard.

The 'rows' 2062 of electrodes form a transmitting channel, while the 'columns' 2064 of electrodes form a receiving channel. In order to detect a touch, a control unit (not shown) sends a signal sequentially to each of the rows (so that at any one time only one electrode row is being 'driven'). This results in a signal being induced in the receiving channels/columns. The touch of a user, or the proximity of a coating 2034, alters the local electric field in the vicinity of the electrodes and thereby alters the signal that is induced in each receiving channel/column. For each pair of rows and columns there will be a single intersection; therefore, by detecting an alteration in the local electric field for a receiving column based on a driven row, it is possible to detect the precise location of a touch or a keypress.

It will be appreciated other arrangements may be used, e.g. where the columns form the transmitting channel of the touch sensor layer 2060 and the rows form the receiving channel of the touch sensor layer.

In order to detect the alteration in the local electric field, it is necessary to calibrate the touch sensor layer 2060 in order to determine a baseline for the induction in each receiving channel (for each transmitting channel). Differences from this baseline measurement can then be detected. In order to calibrate the touch sensor layer, the signal induced in each column 2064 by a signal being sent to each row 2062 is measured in the absence of a user.

It will be appreciated that a change in the local electric field can be caused simply by proximity to the touch sensor layer 2060; it is not necessary for the user or the coating 2034 to directly impact the touch sensor layer.

In order to distinguish between a keypress and the touch of a user, a control unit which receives signals from the touch sensor layer 2060 may:

Determine a direction and/or location of movement—typically, the keys will move substantially perpendicular to the touch sensor layer, so that the detection of a substantial parallel movement is useable to identify a user touch and the detection of a substantial perpendicular movement is useable to identify a keypress. Similarly, the keys 2002 will typically be restrained so that each key has a fixed range and location of motion; in contrast a movement across the keyboard (e.g. a user's touch) is unrestrained. Therefore, a keypress may be identified by identifying a specific location/direction of movement.

Determine a magnitude of a change in the local electric field (e.g. by measuring a current induced in the receiving channels)—typically, the coating 2034 will cause a different (e.g. greater) change in the local electric field than a human finger.

Determine a rate and/or duration of a change in the local electric field—typically a key is pressed and then released so that the duration of the change in the local electric field may be shorter for a key press than for a finger movement. Similarly, the rate of change of the local electric field may be higher for a key press. Additionally, the depression of a key will result in a change that increases to a peak. The release of a key will cause a decrease in a similar way. This may not be true for a user's touch.

In some embodiments, the coating 2034 is not provided and the touch sensor layer 2060 is nevertheless used to determine a keypress. Such detection may occur based on the considerations above; in particular a movement of a finger directly towards the touch sensor (and below the raised level of the keys 2002) may be interpreted as a keypress, while a movement perpendicular to the touch sensor layer may be interpreted as a touch gesture.

In some embodiments, the control unit of the keyboard 2000 processes signals from the touch sensor layer 2060 in dependence on an input mode of the keyboard. The keyboard 2000 may have a plurality of input modes that can be selected by a user, including a keypress input mode and a pointer input mode. In the keypress input mode, the controller of the touch sensor layer may expect keypresses, and so detect an isolated capacitive change indicative of a keypress as a keypress. In the pointer input mode, the controller of the touch sensor layer may expect a user's touch and so may ignore such an isolated change in capacitance, or interpret this change as a touch gesture instead of a keypress.

In some embodiments, the control unit detects keypresses even in the pointer input mode and uses such keypresses as a signal to change to a keypress input mode. Alternatively, the output of pressing a key may differ between the input modes (e.g. the space bar may enter a space when the keyboard is in the keypress input mode and may simulate a mouseclick when the keyboard is in the touchpad input mode).

Exemplary keyboard input modes, and exemplary methods for switching between these input modes, are described in more depth below as well as in WO 2019/237173 A1.

Touch Sensor Modes

As described above, in order to detect an event using the touch sensor (e.g. a touch or a keypress) a control unit sends a drive signal sequentially to each of the rows 2062 and monitors a resultant signal induced in the columns 2064 (or vice versa). In particular, this induced signal can be processed to detect a touch event occurring above the touch sensor layer 2060 and/or a keypress event.

In a basic example, the driving of row x results in a signal being induced in column y. The baseline signal induced in column y due to the driving of row x (e.g. the signal where there is no object above the intersection of row x or column y) can be determined in a calibration process by measuring the signal induced in column y when no object is present. A deviation from this baseline signal can be then used to determine the presence of an object in the vicinity of the intersection of row x and column y. By driving each row and then detecting (for each row) the resultant signal induced in each column, the presence of an object near any intersection of rows and columns can be detected.

More specifically, the control unit drives the rows of the touch sensor layer 2060 consecutively at a certain drive rate, and then scans all of the columns 2064 to detect a corresponding induced signal. Typically, each column is scanned simultaneously.

The control unit typically receives signals continuously from each of the columns of the touch sensor. In order to detect a touch event and/or a keypress event, the signal received from each column is processed (e.g. integrated) over a certain scanning period. For example, each signal may be integrated over a period of 1 ms to detect whether there has been a touch or a keypress near this column in the 1 ms period.

The scanning may also be associated with a scanning rate that is associated with a number of scanning frames to be processed for a given time period. This scanning rate is typically the inverse of the scanning period so that a scanning pattern with a long scanning period has a low scanning rate.

In a practical example, a block of 1 second of time is divided into separate scanning frames. The division of this block may be based on a high scanning period and a low scanning rate (e.g. the block may be divided into twenty 50 ms frames so that the scanning period is 50 ms and the scanning rate is 20 Hz). Equally, the division of this block may be based on a low scanning period and a high scanning rate (e.g. the block may be divided into one thousand frames of 1 ms so that the scanning period is 1 ms and the scanning rate is 1000 Hz). It will be appreciated that in practice frames are processed rapidly and/or in real time. So in practice, instead of receiving a block of 1 second of time and then dividing this block, the control unit will regularly integrate the previous 50 ms or 1 ms of a signal induced in a column of the touch sensor.

In some embodiments, blocks of time are divided into overlapping frames, e.g. a block may be divided into a first frame from 0 ms-5 ms, a second frame from 1 ms-6 ms and so on. However, typically, non-overlapping frames are used to avoid the double detection of a keypress or touch event (with overlapping frames, if a keypress occurs at 2 ms it may be detected in both the first frame and the second frame and therefore registered twice).

While this description primarily describes a drive signal being applied to the rows 2062 of the touch sensor layer 2060, and the control unit then scanning the columns 2064 of the touch sensor to detect a touch event and/or a keypress event, it will be appreciated that the drive signal could equally be applied to the columns of the touch sensor with the scanning occurring at the rows of the touch sensor. More generally, the touch signal comprises a transmitting channel (one of the rows and the columns) and a receiving channel (the other of the rows and the columns), where a drive signal is applied consecutively to the transmitting channels and the control unit scans the receiving channels to detect a touch event and/or a keypress event.

As explained above, the columns 2064 may be scanned based on different scanning periods and/or rates.

The use of a high scanning rate and/or a low scanning period enables the touch sensor to detect rapid events more accurately (since each scanning frame relates to only a short period, so two consecutive events are unlikely to fall into the same scanning frame). However, the use of a high scanning rate reduces the time available for any event to be processed. Therefore, if a high scanning rate is used, low magnitude events are more likely to be missed (low magnitude events can be lost in background noise if the induced signals are integrated over a short period.

In this regard, touch events typically have a low signal to noise ratio (SNR) as compared to keypress events. This is partly because touch events tend to occur on the surface of the keys when the keycaps are in a raised position (and so the user's fingers are far from the touch sensor). Conversely, keypress events tend to have a comparatively higher signal to noise ratio, not least because as a key is depressed the user's fingers and a coating associated with the key (if a coating is provided) approach the touch sensor layer 2060. As described above, the coating of each key is typically arranged to approach an intersection of the rows 2062 and columns 2064 of the touch sensor layer; this further improves the signal to noise ratio for keypresses.

However, while keypresses are typically associated with signals of high magnitude, keypresses are also short events; therefore, a keypress event typically results in a short, sharp, variation in a signal induced in a column of the touch sensor. Such short events may be missed by a touch sensor that uses a low scanning rate, especially where multiple keypress events occur in a short amount of time. In particular, where a single key is pressed multiple times and a long scanning period is used, these multiple keypresses may fall within the same scanning frame and so only a single keypress may be detected following the integration of a scanning frame.

Due to the low SNR of touch events, in order to accurately process touch events, the touch sensor layer 2060 may be arranged to operate based on a high scanning period and/or a low scanning rate. Specifically, the control unit may be arranged to use a scanning period of at least 2 milliseconds (ms), at least 5 ms and/or at least 10 ms and/or the control unit may be arranged to use a scanning rate of no more than 250 Hz, no more than 200 Hz, and/or no more than 100 Hz. With these scanning periods and scanning rates, each column of the touch sensor is scanned for a sufficient time to enable accurate detection of touch events.

Each column may be scanned for a single substantial time period. Equally, each column could be scanned for a plurality of shorter component periods (still based on the low rate scanning signal), For example, instead of being scanned from 0 ms-5 ms, a column may be scanned from 0 ms-2.4 ms and then 2.6 ms-5 ms with the plurality of shorter component periods being processed together to enable accurate detection of a touch. The use of a long scanning period thus also discloses the use of a long scanning period that comprises a plurality of shorter, optionally non-consecutive, component scanning periods.

Since keypresses are often associated with fast events, in order to accurately and quickly detect groups of keypresses, the touch sensor layer 2060 may be arranged to operate based on a high scanning rate and/or a low scanning period. For example, the control unit may be arranged to use a scanning rate of at least 250 Hz, at least 500 Hz, at least 750 Hz, and/or at least 1000 Hz and/or the control unit may be arranged to use a scanning period of no more than 1 ms, no more than 1.3 ms, no more than 2 ms, and/or no more than 2.5 ms. Since keypresses are typically associated with a high signal to noise ratio, the use of a high scanning rate and a low scanning period does not preclude the control unit from accurately detecting keypresses. The signal to noise ratio associated with keypress events can also be increased by the use of coatings associated with the keys to further ensure high accuracy with a high scanning rate.

Figure 10:
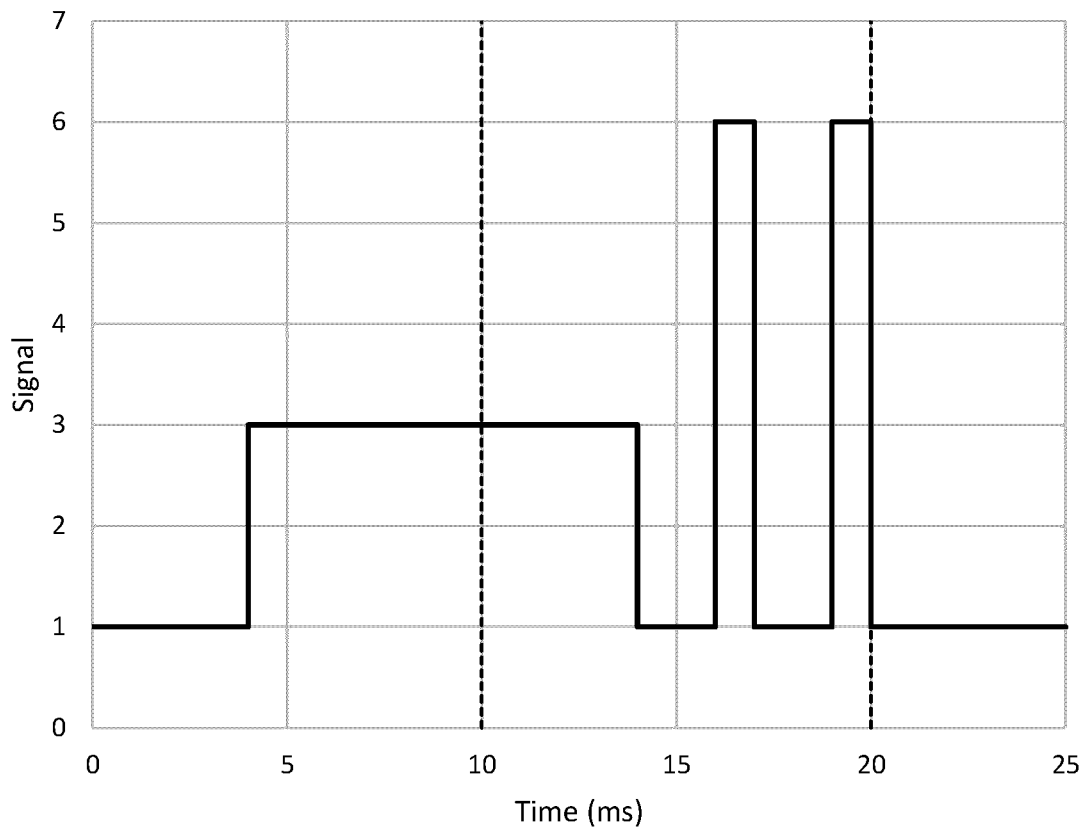
FIG. 10 shows an illustrative signal that may occur in a receiving channel of the touch sensor.

Referring to FIG. 10, there is shown a simplified illustrative example of a signal in a column that has: a constant background noise of magnitude 1, a touch event of magnitude 2 from t=4 ms-14 ms, and two keyboard press events of magnitude 5 from t=16 ms-17 ms and t=19 ms-20 ms.

Using a scanning period of 10 ms would result in the two keypresses falling into the 10 ms-20 ms block; therefore, only one of these keypresses would be detected. However, using a shorter scanning period might result in the relatively low magnitude touch event being missed.

Therefore, the present disclosure relates to a touch sensor that is arranged to operate based on a first scanning period and/or scanning rate and a second scanning period and/or scanning rate, where the first and second scanning periods/rates are different. Using the example of FIG. 10, a scanning period of 10 ms would be suitable to detect the touch event and a scanning period of 1 ms would be suitable to detect both keypresses. By providing a touch sensor that can operate with both of these scanning periods, all types of events can be accurately detected.

It will be appreciated that FIG. 10 is only a very simple illustrative example and that in practice the periods and comparative magnitudes of these events may differ.

Typically, to enable accurate detection of both touch events and keypress events the keyboard 2000 is arranged to operate in one or more of the following scanning modes:

A touch scanning mode. The touch scanning mode typically uses a comparatively high scanning period (e.g. 5 ms-10 ms) and/or a comparatively low scanning rate (e.g. 100-200 Hz). This mode is suitable for detecting and interpreting touches on the keys of the keyboard.

A keypress scanning mode. The keypress scanning mode typically uses an intermediate scanning period (e.g. 2 ms-5 ms) and/or an intermediate scanning rate (e.g. 200-500 Hz). This mode is suitable for precisely detecting key coordinates in order to accurately classify keypresses.

A keypress detection mode. The keypress detection mode typically uses a comparatively low scanning period (e.g. 1 ms-2 ms) and/or a comparatively high scanning rate (e.g. 500-1000 Hz). This mode can be used to detect the depression of a key of a keyboard.

In some embodiments, the touch sensor layer 2060 is arranged to operate in each of a self capacitance mode and a mutual capacitance mode. The mutual capacitance mode operates as described above, where a driving signal is provided to the rows of the touch sensor and this driving signal induces a signal in the columns of the touch sensor (or vice versa), which induced signal can be processed to identify a touch or keypress. In the self-capacitance mode, the rows and columns of the touch sensor operate independently, with a signal being driven through each of the rows and the columns. The location of a touch can then be detected by a local change in capacitance in each of the rows and the columns (with this change in capacitance being caused by the movement of a coating and/or a user's finger). Operation in a self capacitance mode provides a stronger signal than operation in a mutual-capacitance mode and enables rapid detection of a touch, since the driving signal may be provided substantially continuously and the scanning rate may be very high (e.g. in excess of 1000 Hz). However, the use of the self-capacitance mode can prevent the accurate resolution of multiple touches due to the occurrence of 'ghost' events.

In some embodiments, the keypress detection mode is a self capacitance mode, which is useable to rapidly pick up keypresses and provide approximate locations of the keypresses, and the keypress scanning mode is a mutual capacitance mode, which is useable to accurately detect keypresses at multiple locations. The keypress scanning mode may be activated in dependence on the detection of a keypress in the keypress detection mode, so that the keypress detection mode rapidly detects the occurrence of a keypress and the keypress scanning mode thereafter accurately detects the location of the keypress and/or of following keypresses.

Not least due to the offset between the rows of certain standard keyboard layouts (e.g. the ANSI keyboard layout), 'ghost' events can typically be detected and ignored so that a self capacitance mode may be used to accurately resolve keypresses. In this regard, ghost events occur where there are two or more touches on the touch sensor; for example, a first touch at an intersection of an mth row and a nth column and a second touch at an intersection of an (m+1)th row and an (n+3)th column. In this situation, the control unit only identifies that touches have occurred on the mth and (m+1)th row and on the nth and (n+3)th column; therefore, alongside the real events, ghost events will be detected at the intersections of the (m+1)th row and the nth column and at the intersection the mth row and (n+3)th column.

According to the present disclosure, the control unit of the keyboard may process signals to remove ghost touches. Since the keys are in a fixed arrangement, the expected locations of possible keypress are known to a high degree of accuracy (e.g. the keys may be arranged so that keypresses are expected to be detected directly above intersections of the rows and columns of the touch sensor). Therefore, keypress events that are detected in unexpected locations (e.g. between intersections of the rows and columns of the touch sensor) may be determined to be ghost events and may be discounted by the control unit. In practice, due to the offset between rows of standard keyboards, the locations of ghost events are likely to be away from the locations of potential keypresses, so that accurate detection of ghost events is typically possible.

Therefore, the keyboard may be provided with only two modes, in particular a self capacitance keypress detection mode and a mutual capacitance touch detection mode.

In some embodiments, the detection of ghost events may not be possible for all events (e.g. there may be some situations in which a potential ghost event occurs at the location of a potential keypress). Therefore, the keyboard may be arranged to operate in a self capacitance scanning mode when accurate determination of a ghost event is possible (e.g. because the potential ghost event occurs between intersections of the rows and columns of the touch sensor) and to switch into in a mutual capacitance keypress scanning mode when accurate determination of a ghost event is not possible.

It will be appreciated that in order to detect keypresses the keyboard 2000 may use only a single one of the keypress detection mode and the keypress scanning mode. For example, in some embodiments the keypress detection mode is not provided.

The scanning mode of the keyboard 2000 may be dependent on an input of a user and/or on a recent event. For example, the user may be able to switch the keyboard between the touch scanning mode and the keypress scanning mode.

Typically, the keyboard 2000 is arranged to default to the touch scanning mode, where the detection of a keypress (e.g. the detection of a signal variation of large magnitude in a column of the touch sensor) results in the keyboard switching into the keypress detection mode or the keypress scanning mode. This keypress detection mode or keypress scanning mode can then be used to detect a rapid series of keypresses. In this regard, when a user is typing a word or sentence, there is often a first keypress that is followed by a rapid series of further keypresses.

The scanning rate of the touch scanning mode is typically sufficient to accurately detect the first keypress, but in order to accurately resolve following keypresses it may be beneficial to use a higher scanning rate, such as that of the keypress detection or keypress scanning mode.

Referring to the example of FIG. 10, the keyboard 2000 may operate in the touch scanning mode by default, so that in a first touch scanning frame from 0 ms-10 ms the keyboard detects the touch event starting at 4 ms. In a second scanning frame from 10 ms-20 ms, the keyboard detects the continuing touch event as well as detecting at least one keypress event. The keyboard is typically able to distinguish between touch events and keypress events, e.g. based on a signal magnitude. When a keypress is detected, the keyboard typically switches into the keypress scanning mode.

Continuing with the example of FIG. 10, the keyboard 2000 may switch into the scanning mode following the second touch scanning frame (e.g. at t=20 ms). However, in order to ensure that no keypresses are missed, typically the keypress scanning mode is arranged to interrupt and/or overlap the touch scanning mode. For example, the keyboard may reprocess the signal from 10 ms-20 ms using the keyboard scanning mode (and the keyboard may comprise a cache that stores previous signal values to enable this reprocessing). Therefore, following the detection of the keypress the keyboard may process (e.g. integrate) the signal from 10 ms-20 ms using five separate frames of 2 ms each. Using such frames, the keyboard can identify that there are two keypresses during this period.

More generally, the keyboard may be arranged to process the same portion of a signal based on each of a first mode and a second mode, where the processing based on the second mode is dependent on a keypress event being detected using the first mode.

To avoid duplication of events, the keyboard may be arranged to output only touch event data in the touch scanning mode and to output only keypress event data in the keypress scanning and/or keypress detection modes. Therefore, the processing of this signal may involve:
a) Using a touch scanning mode to integrate the signal from 0-10 ms.
b) Detecting and outputting the touch event starting at 4 ms.
c) Using a touch scanning mode to integrate the signal from 10-20 ms.
d) Detecting (but not outputting) a keypress event (based on a large magnitude of the integrated signal).
e) Using a keypress scanning mode to integrate a frame from 10-12 ms.
f) Using a keypress scanning mode to integrate a frame from 12-14 ms.
g) Using a keypress scanning mode to integrate a frame from 14-16 ms.
h) Using a keypress scanning mode to integrate a frame from 16-18 ms.
i) Detecting and outputting the keypress event at 16 ms.
j) Using a keypress scanning mode to consider a frame from 18-20 ms.
k) Detecting and outputting the keypress event at 19 ms.

With the above example, the continuation of the touch event from 10 ms-14 ms is not output by the keyboard. In practice, touch events and keypress events are likely to be separated by a more substantial period of time (due to the limited speed of the hands of a user) and so the interruption of the touch scanning mode by the keypress scanning mode is normally not problematic and normally does not result in the neglecting of a touch signal.

In some embodiments, the keyboard is arranged to process the signal based on the touch detection mode in dependence on the time of a detected keypress. With the above example, the keyboard may identify that there are no keypresses before 16 ms and thereafter use a touch detection mode to search for touches in the period from 10-16 ms.

An implementation of the above-described scanning modes is now described with reference to the flowcharts of FIGS. 11a and 11b.

Figure 11A:
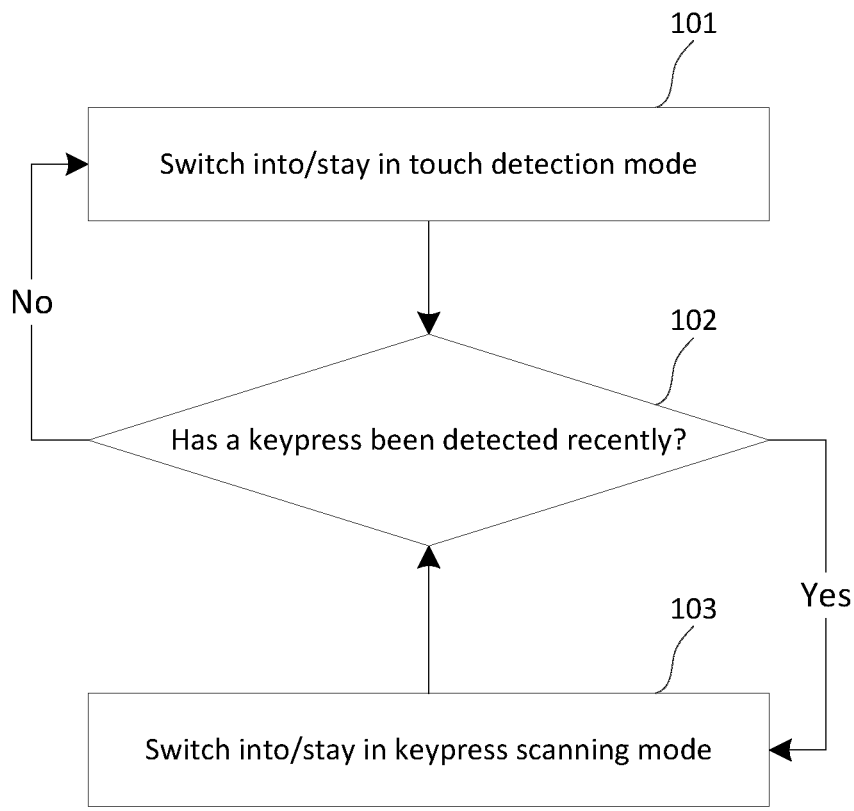
FIGS. 11*a* and 11*b* show methods of switching between scanning modes of the keyboard.

Referring to FIG. 11a, the keyboard 2000 typically starts in a touch scanning mode.

The keyboard 2000 then continuously/regularly determines 102 whether a keypress has occurred (e.g. by detecting a large variation in a signal in the columns 2064 of the touch sensor layer 2060 while in the touch scanning mode).

If a keypress has occurred, the keyboard 2000 switches 103 into a keypress scanning mode. If a keypress has not occurred recently, then the keyboard stays 101 in the touch scanning mode. Switching the scanning mode may involve reprocessing of a preceding period of the signal as described above.

When the keyboard 200 is in the keypress scanning mode, the keyboard continues to determine whether a keypress has occurred recently. If a keypress has occurred recently, the keyboard 2000 stays 103 in the keypress scanning mode. If a keypress has not occurred recently, then the keyboard switches 101 into the touch scanning mode. Switching the scanning mode may involve reprocessing of a preceding period of the signal as described above.

In this context, a keypress having been detected recently may, for example, comprise a keypress having been detected in a previous scanning frame and/or a previous time period (e.g. the previous 10 ms).

Figure 11B:
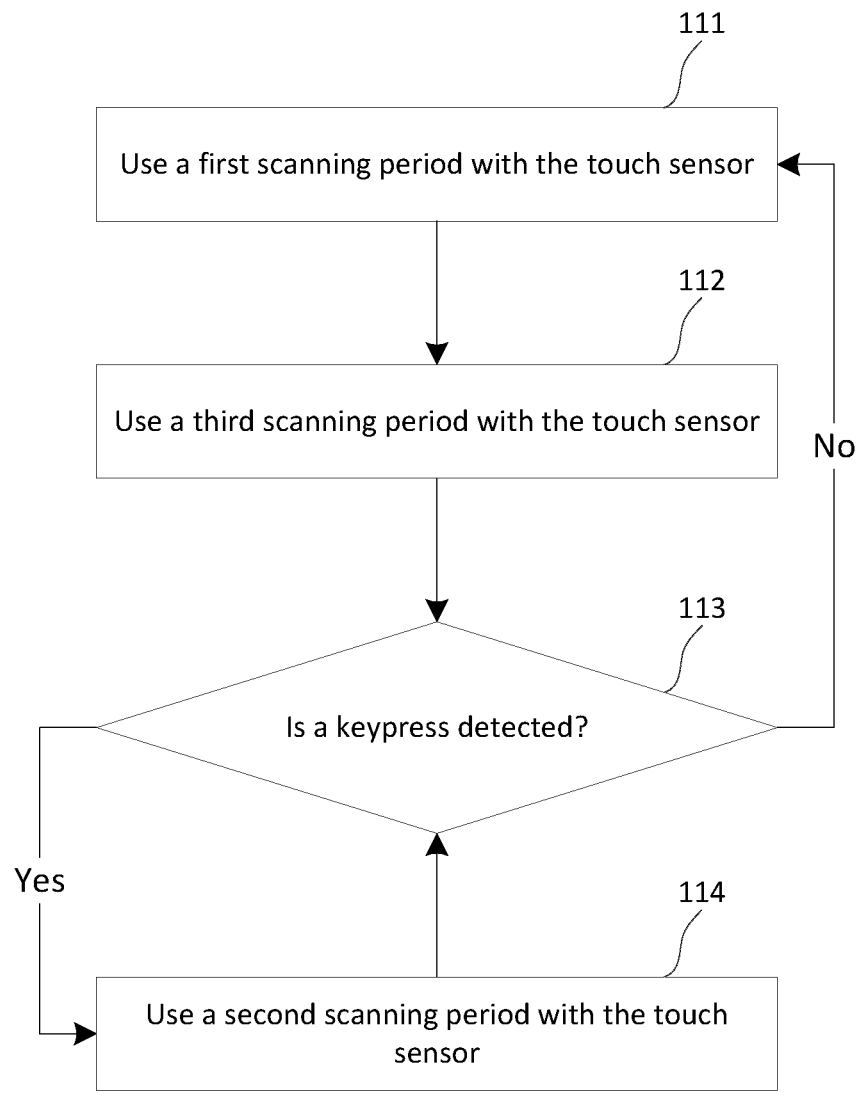

Referring to FIG. 11b, an implementation that uses three scanning rates/scanning modes is described.

In a first step 111, the keyboard 2000 (e.g. the control unit of the keyboard) uses a first scanning period with the touch sensor. This first scanning rate may be associated with the keyboard operating in the touch scanning mode.

In a second step 112, the keyboard 2000 uses a third scanning period with the touch sensor. This third scanning period may be associated with the keyboard operating in the keypress detection mode.

The first step 111 and the second step 112 may involve interrupting the touch scanning mode with the keypress detection mode. So the touch scanning mode may be used to process touch scanning frames between, for example, 0.1 ms-1 ms, 1.1 ms-2 ms, 2.1 ms-3 ms, and, so on with the keypress detection mode being used between 0 ms-0.1 ms, 1 ms-1.1 ms, 2 ms-2.1 ms, and so on. The signals across each of the component touch scanning frames may be combined and integrated. This alternating operation provides a sufficient total touch scanning period to accurately detect touch events with the touch scanning mode while also providing rapid detection of keypresses using the keypress detection mode. In practice, the touch scanning mode is typically interrupted more regularly but for shorter periods of time (since only a very short period of time is required to detect a high SNR keypress event, especially if the keyboard detection mode is a self capacitance mode).

In a third step 113, the keyboard 2000 (e.g. the control unit of the keyboard) determines whether a keypress has occurred recently.

If a keypress has not occurred, the method returns to the first step 111.

If a keypress has occurred recently, then in a fourth step 114, the keyboard 2000 uses a second scanning period with the touch sensor. This second scanning period may be associated with the keyboard operating in the keypress scanning mode.

Following the fourth step 114, the method returns to the third step 113 and the keyboard 2000 again determines whether a keypress has occurred recently.

Typically, the detection of a keypress activates the keypress scanning mode. For example, the detection of a keypress in the keypress detection mode may active the keypress scanning mode for a short period (e.g. a few microseconds) following the detection.

Typically, the absence of a keypress event for a certain period of time (e.g. the lack of detection of a signal of large magnitude in a column of the touch sensor layer 2060 for a certain period of time) when the keyboard 2000 is in the keypress detection mode or the keypress scanning mode results in the keyboard switching to the touch scanning mode. The keyboard is typically arranged to switch to the touch scanning mode if no keypress is detected within a certain time period, where this certain period may be no more than 1 second, no more than 100 ms, and/or no more than 10 ms (e.g. the keyboard may be arranged to switch into the touch scanning mode if no keypress events are detected for a period of 10 ms) and/or where this certain time period may be at least 1 ms, at least 10 ms, and/or at least 100 ms.

The above-described features result in a keyboard 2000 where touch events and keypress events can be accurately and rapidly identified while a user is still able to alternately perform keypress events and touch events without a noticeable intervening period.

In some embodiments, the keyboard 2000 is arranged to operate alternately in the touch scanning mode and keypress detection mode or keypress scanning mode. That is, the touch scanning mode is arranged to be periodically interrupted by the keypress scanning mode or the keypress detection mode. For example, the low rate touch scanning mode signal may be used for a period of 1 ms, before the high rate keypress detection mode signal is used for a period of 0.1 ms, and so on.

In some embodiments, the touch scanning mode and the keypress detection mode or keypress scanning mode are arranged to be used for different columns of the touch sensor layer 2060. For example, the touch scanning mode may be used for a first set of columns of the touch sensor and the keyboard scanning mode may be used for a second set of columns of the touch sensor. Equally, the touch scanning mode may be used for a first set of columns of the touch sensor while the keyboard scanning mode is used for the whole of the touch sensor so that the modes are used simultaneously for the first set of columns (and a method of simultaneous operation of modes is described below).

These sets of columns may then use alternating operation; for example, the control unit may alternate between the touch scanning mode and the keypress scanning mode for the first set of columns and between the keypress scanning mode and the touch scanning mode for the second set of columns. These sets of columns may be arranged so that each set of columns comprises columns distributed across the keyboard (e.g. the first set may comprise first, third, fifth, etc. columns and the second set may comprise second, fourth, sixth etc. columns). This enables detection of both touch events and keypress events across the entirety of the keyboard 2000, albeit typically with reduced accuracy compared to where a single mode is used for all the columns.

In practice, this alternating operation may comprise the control unit using a combined scanning frame (that is repeated continuously). This combined scanning frame may be formed of a single touch detection frame (that contains a low rate scanning signal) and one or more keypress detection and/or scanning frames (that contain a high rate scanning signal). For example, a combined scanning frame may be used from 0 ms-7.5 ms that comprises a single touch scanning frame from 0 ms-5 ms (if the touch scanning rate is 200 Hz) and then two keypress scanning frames from 5 ms-7.5 ms (if the keypress scanning rate is 500 Hz). Such a combined scanning frame may then be repeated from 7.5 ms-15 ms, and so on.

In some embodiments, the keyboard 2000 is arranged to operate simultaneously in the touch scanning mode and the keypress detection mode or keypress scanning mode Again using the example of FIG. 10, the control unit may use the touch scanning mode to process the signal over a single 5 ms frame from 0 ms-5 ms. The control unit may also use the keypress scanning mode to process the signal over five 1 ms frames of the same period (e.g. from 0 ms-1 ms, 1 ms-2 ms, and so on). This enables the accurate detection of touches using a touch scanning mode with a high scanning period/low scanning rate and also accurate detection of keypresses based on a keypress scanning mode with a lower period/higher rate.

As has been described above, the touch scanning mode may be arranged to output only touch events and the keypress scanning mode may be arranged to output only keypress events to avoid duplication of outputs.

In practice, a plurality of the rows of the touch sensor may be driven simultaneously, where these rows may be driven using signals with different encodings, different modulations, different phases and/or different amplitudes. These drive signals may each induce a component signal in a column of the touch sensor, where the control unit is able to distinguish between the component signals based on the different encodings of the drive signals to determine the location of a touch or a keypress.

Typically, the rows are divided into sets, which sets are driven simultaneously. For example, a first set of rows may comprise the first, sixth, eleventh, and sixteenth rows with a second set comprising the second, seventh, twelfth, and seventeenth rows. The rows in these sets are typically selected to be spaced to minimise the number of component signals induced in any of the columns at any given time.

Since the drive signal is typically provided at a high rate, the detection of the induced signals in the columns typically involves processing of induced signals over multiple drive cycles. For example, where the drive rate is 100 KHz, each row of the touch sensor is only energised for a very small time; therefore, the processing of an induced signal in a column may occur over a plurality of energisation instances.

Different parts of the keyboard 2000 may use different scanning modes. For example, the touch sensor layer 2060 may comprise a plurality of component touch sensors which operate differently based on different expectations. Users might be expected to perform touch events towards the centre of the keyboard, therefore there may be provided a first component touch sensor in the centre of the keyboard that in a default mode uses long bursts of a touch scanning signal alternated with short bursts of a keypress scanning signal. Conversely, users may be expected to mostly perform keypresses near the edges of the keyboard (e.g. near the spacebar), so there may be provided a second component touch sensor near the edges of the keyboard that in a default mode provides long bursts of a keypress scanning signal alternated with short bursts of a touch scanning signal.

The above description has primarily considered the touch scanning mode processing a signal over a single frame with a substantial time period. It will be appreciated that equally processing may occur over a plurality of frames of a shorter time period. For example, the frames of the touch scanning mode and the keypress scanning mode may be the same, where the touch scanning mode is associated with the combined processing of a greater number of frames (and so a greater scanning period) than the keypress scanning mode.

Calibration

The touch sensor is typically a capacitive sensor that is arranged to detect the movement of objects above the touch sensor by detecting a change in the local electric field. As has been described above, the touch sensor may also be implemented using, for example, optical cameras and/or pressure sensors.

With each of these embodiments, the operation of the touch sensor is dependent on the componentry surrounding the touch sensor. For example, the operation of the touch sensor may depend on the keys used for the keyboard 2000 and depend on where in the keyboard the touch sensor is located (e.g. whether the touch sensor is located above or below a backlight layer). This componentry is dependent on the keyboard in which the touch sensor is used, where similar touch sensors may be used in a variety of different types of keyboard. For example, similar touch sensors may be used for both low-profile, compact, laptop keyboards and larger desktop keyboards. Equally, similar touch sensors may be used for both simple keyboards with few components and more complex keyboards with backlights and other optional components.

As used herein, componentry typically relates to the (internal) keyboard structure, and in particular to the structure of any components that are between the touch sensor and the user's fingers during the use of the keyboard. In this regard, the operation of the touch sensor depends on features such as the keyboard mechanisms, the transmittal mechanisms, the other layers used etc. Where the touch sensor layer comprises holes, or where any componentry adjacent the touch sensor layer (e.g. the protective layer 2070) comprises holes, the operation of the touch sensor depends on the arrangement of the holes. In particular the operation of the touch sensor is dependent on the protective layer, and on the arrangement of holes in the protective layer.

Due to this dependence on surrounding componentry, there is a risk of the touch sensor providing unexpected or inconsistent outputs. For example, the touch sensor may detect only a small change in the electric field when a user moves their finger from the 'a' key to the ' key and then detect a large change in the electric field when the use moves their finger from the' key to the 'g' key. If the user is attempting to scroll across a page, such detection could lead to a jerky scrolling process that starts slowly and then suddenly jumps. Furthermore, there may be an inconsistent response as a user moves their finger across a key, so that a pointer speed may be slow when a user's finger is near the edge of the key and then increase as the user moves their finger towards the centre of the key.

Figure 12:
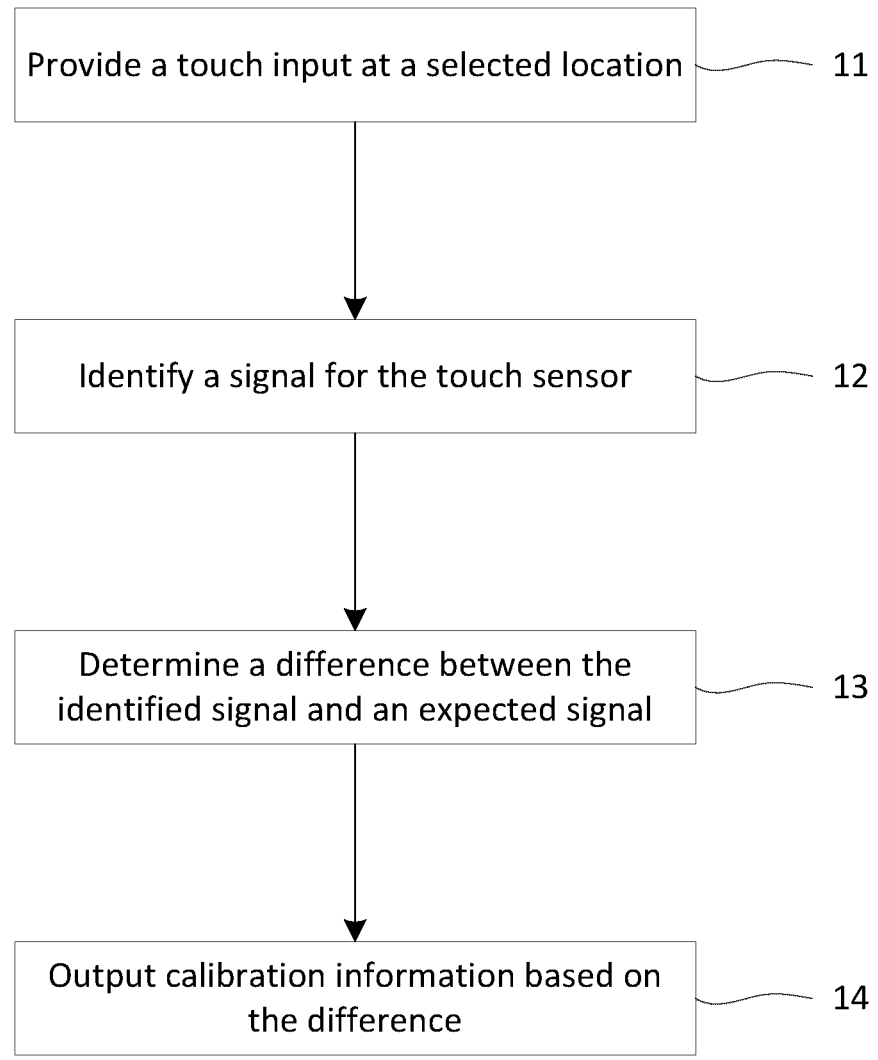
FIG. 12 shows a method of calibrating the touch sensor.

Therefore, referring to FIG. 12, there is described a method of calibrating the touch sensor. This method is typically carried out by a user and/or manufacturer of the keyboard. Typically, certain steps of the method are computer-implemented. By calibrating the touch sensor, it is possible to provide a consistent (and predictable) output.

In a first step 11 of the method of calibration, the user provides a touch input at a selected location and in a second step 12, a computer device associated with the touch sensor identifies the resultant signal at the touch sensor.

Where the touch sensor comprises a capacitive touch sensor, the first step 11 and the second step 12 typically involve the user touching the keyboard at a certain location and a processor associated with the touch sensor thereafter determining a change in electric field that is detected by the touch sensor.

In a third step 13, the user determines a difference between the identified signal and an expected signal. The expected signal is associated with the touch input.

In a simple example, the expected input relates to a location of the touch, and the user expects the touch sensor to accurately detect touches at specific locations. The componentry surrounding the touch sensor may affect the detection of touches so that, due to the effects of surrounding componentry, a touch on the 'f' key may be detected by the touch sensor as being a touch that is offset from the 'f' key. In this instance, the difference between the identified signal and the desired signal is the offset.

Typically, the difference comprises a vector that maps an identified touch point to an actual touch point.

The difference may also be related to a magnitude of the identified signal, a direction of the identified signal, and/or a movement of the identified signal. For example, the distance of a gesture from the keyboard (e.g. how far above the keys a user's finger is) is typically determined based on a magnitude of a signal identified by the touch sensor. Therefore, the difference may be related to the difference between an identified magnitude that is detected by the touch sensor and an expected magnitude. The expected magnitude may be selected so that any touch on the keys has the same expected magnitude.

Furthermore, the difference may be based on a movement of a touch input, for example, the user may input a gesture that moves in a single direction and then determine if the identified signal diverges from this single direction.

In a fourth step 14, calibration information based on the difference is output. Typically, the calibration information is determined using a processor (e.g. a processor of the keyboard 2000 and/or a processor of an external computer device to which the keyboard is connected). Outputting the calibration information may then comprise showing the difference to a user, or storing the calibration information in a storage of the keyboard and/or the external computer device so that the difference can be referenced later. Outputting the calibration information may comprise outputting a table of differences relating to different locations of the keyboard.

The keyboard 2000 (or an associated computer device) may reference the calibration information when interpreting a subsequent touch input. In particular, the keyboard may modify a detected signal based on the calibration information and then output the modified signal.

The method of FIG. 10 may be performed by a user when the keyboard is received and/or may be performed by a manufacturer of the touch sensor and/or the keyboard before sale to the user.

The differences between the identified signal and the expected signal are typically a result of the componentry of the keyboard 2000, so that it can be beneficial to calibrate the touch sensor once it has been installed in the keyboard. Therefore, this method is typically carried out when the keyboard has been assembled.

Referring to FIG. 13 and FIGS. 14a-14c, there is described a method of obtaining calibration information, which may be an automated (e.g. computer-implemented) method. This method may form a part of the manufacturing process of the keyboard 2000. The use of an automated calibration process simplifies, and speeds up, the manufacturing of the keyboard and improves the user experience since the touch sensor will work accurately as soon as the user installs the keyboard. This method is typically a computer-implemented method that is carried out by a computer device such as a computer numerical control (CNC) machine.

In a first step 21, the computer device determines a plurality of testing locations for a touch sensor and/or keyboard. This may comprise determining a grid of testing locations, where the computer device (e.g. the CNC machine) can then move along each of the rows and columns of this grid in turn. For example, the computer device may draw a grid over the keyboard with a step of 2 mm. It will be appreciated that other sizes of grids may be used and that, even more generally, any arrangement of testing locations may be used (e.g. an irregular arrangement may be used to test the plurality of testing locations).

In some embodiments, the computer device is arranged to determine a plurality of testing locations that covers only a portion of the touch sensor (e.g. a portion associated with two keycaps). These testing locations are then used to infer calibration information for the entirety of the touch sensor. This method is particularly applicable where a regular layout is used for the touch sensor and the keyboard.

In a second step 22, the computer device identifies a signal for the touch sensor at each testing location. The computer device may comprise a conductive material that causes a substantial change in the local electric field as it is passed across the touch sensor. This can simplify the identification of these signals.

Figure 14A:
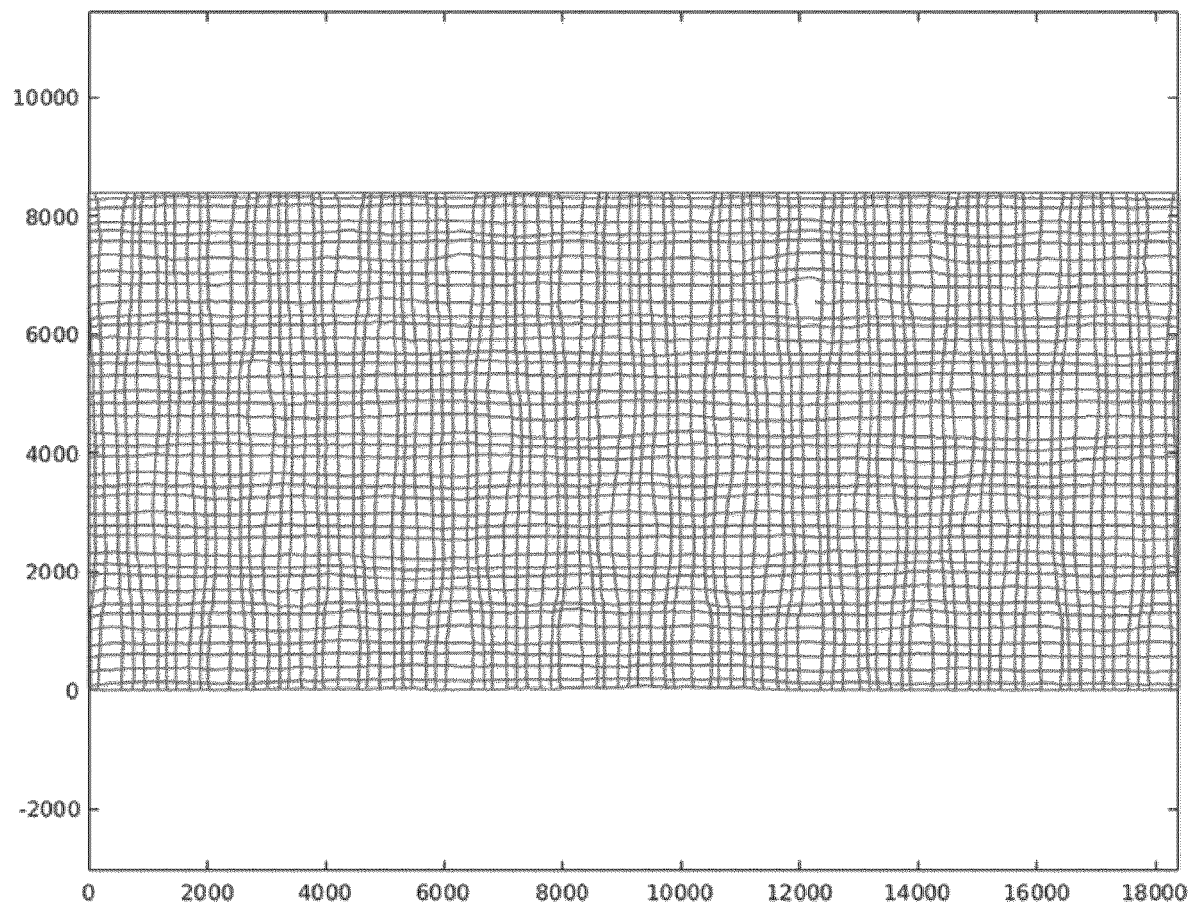
FIGS. 14*a*-14*c* show examples of a practical implementation of the method of FIG. 13.

An exemplary map of identified signals is shown in FIG. 14*a*, where this map relates to a CNC machine drawing a regular grid over the keyboard. Since the CNC machine has drawn a regular grid over the keyboard, it would be expected that the touch sensor would similarly detect a regular grid; however, as shown by FIG. 14*a*, in practice the signals detected at the touch sensor diverge from the expected signals.

Therefore, in a third step 23, the computer device determines a difference between the identified signal and the expected signal at each of the testing locations. As explained above, the componentry of the keyboard 2000 can cause differences between an intended (or expected) input signal and an identified signal. The differences can be determined based on the signal identified in the touch sensor at each of the testing locations.

Figure 14B:
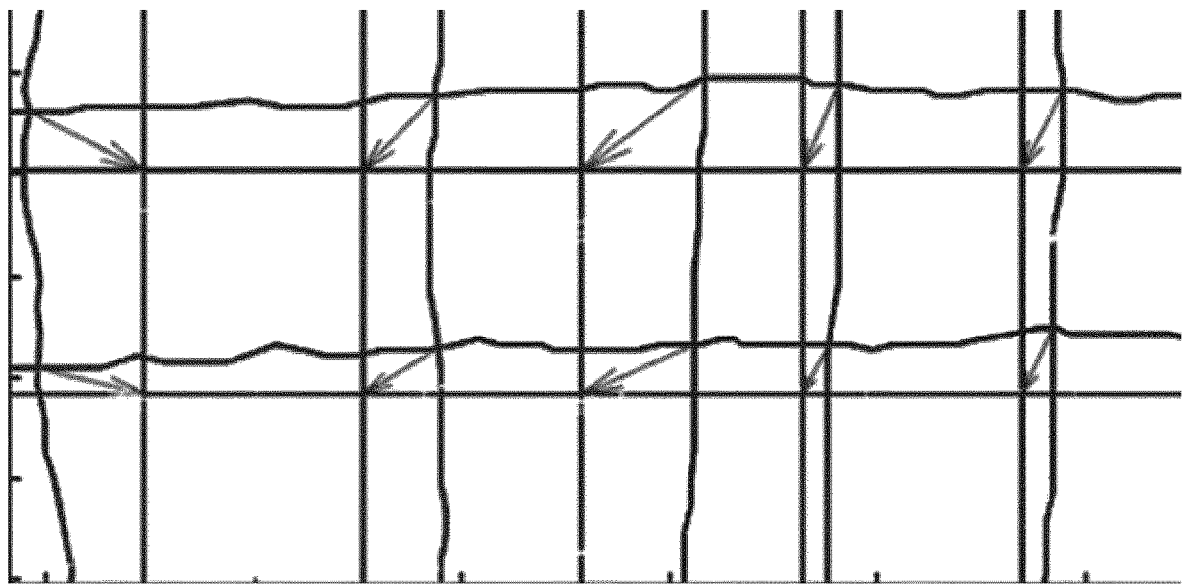

Referring to FIG. 14*b*, the differences between the identified signals and the expected signals can be determined by comparing the expected signal and the identified signal at each of the intersections of the grid that is drawn by the computer device. These differences can be stored as vectors and/or as scalar values.

Further differences may be interpolated; for example, the difference for a location that is between two intersections of the grid may be interpolated based on the differences at those intersections.

In a fourth step 24, the computer device outputs the calibration information. This calibration information can thereafter be used to modify a signal detected by the touch sensor before this modified signal is output by the keyboard 2000.

In some embodiments, the computer device determines (and outputs) a plurality of sets of calibration information. In particular, the computer device may determine calibration information for different sets of testing locations (e.g. for both of a 1 mm grid and a 1.5 mm grid) and output each of these sets of calibration information. A suitable set of calibration information can then be determined when a touch is detected by the touch sensor (at a later date); for example the 1 mm grid information may be used when a touch of a stylus is detected and the 1.5 mm grid information may be used when a touch of a finger is detected.

Figure 14C:
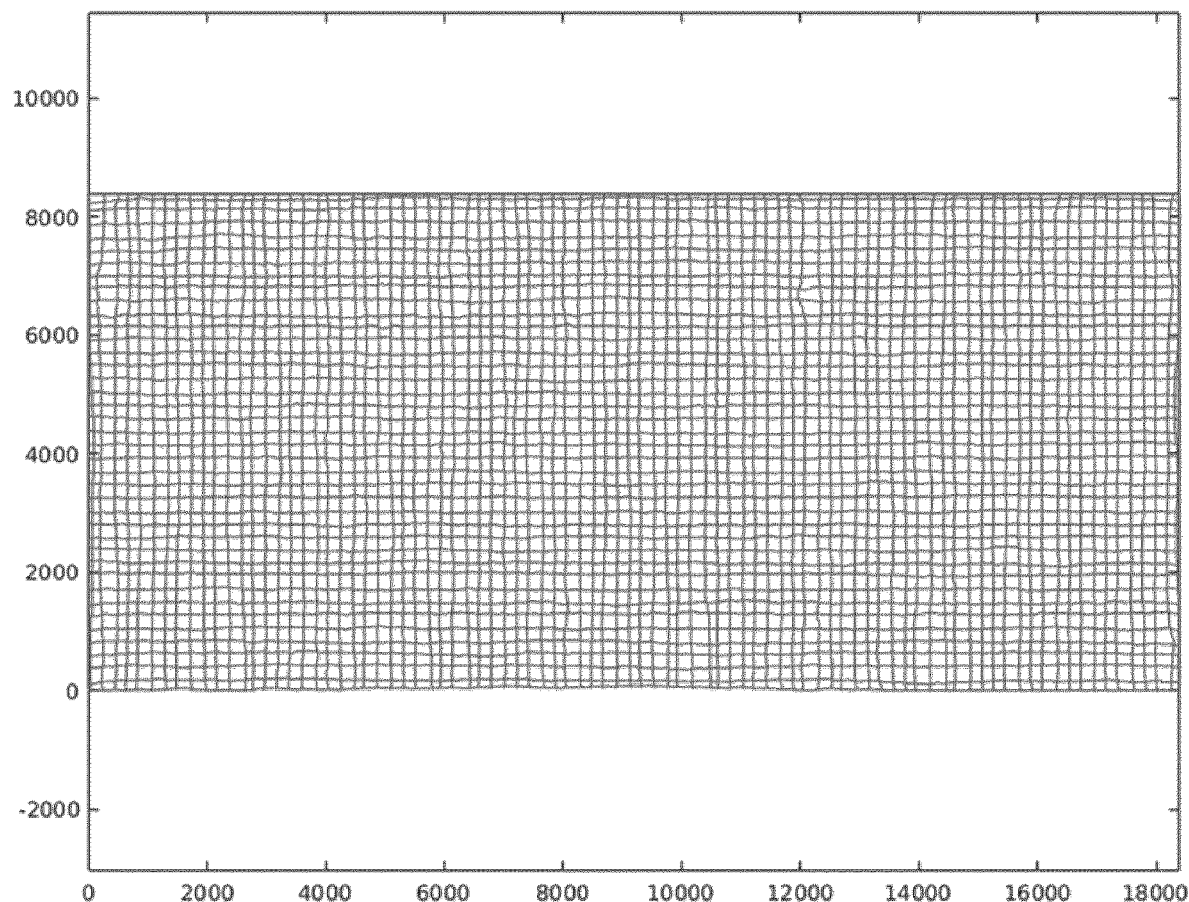

Referring to FIG. 14*c*, there is shown a grid of modified signals, where these modified signals relate to a subsequently drawn grid. The modified signals comprise a combination of identified signals (e.g. as shown in FIG. 14*a*) and the differences determined during the calibration method (e.g. as shown in FIG. 14*b*).

It can be seen that the modified signals of FIG. 14*c* are substantially closer to forming the expected grid than the unmodified signals of FIG. 14*a*.

The differences between the identified signals and the expected signals are primarily dependent on the componentry of the keyboard 2000. For example, the keys of the keyboard may interact with the local electric field and thus contribute to the differences. Therefore, different samples of the same product series are typically associated with similar calibration information. This enables the entirety of a production run of a first type of keyboard to be associated with a first set of calibration information and the entirety of a production run of a second type of keyboard to be associated with a second set of calibration information.

While there will be some variation in the differences for each individual keyboard, this variation is typically small. Therefore, the calibration information for a first keyboard of the first type of keyboard can be used for a second keyboard of the first type of keyboard.

In other words, the calibration information for a first keyboard comprising a touch sensor may be determined based on the calibration information for a second, similar, keyboard. This enables calibration to be undertaken on a single keyboard of a product series to obtain calibration information, where this calibration information can then be used for each other keyboard in that product series.

Figure 15:
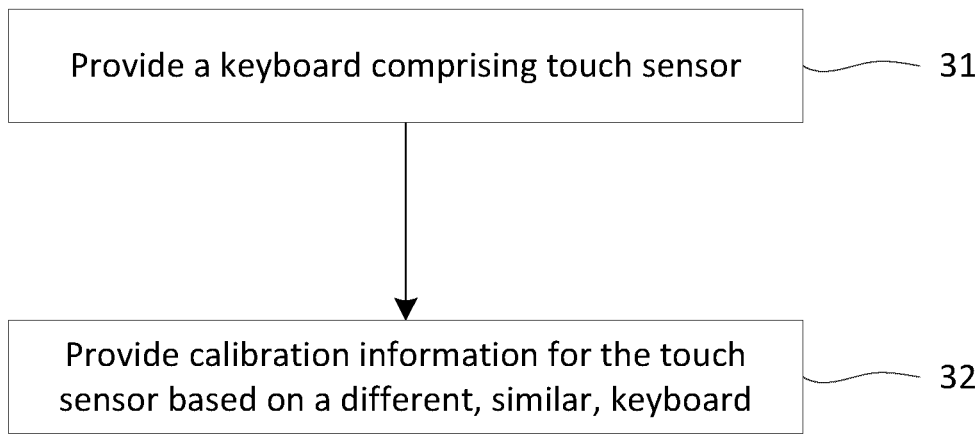
FIG. 15 shows a method of providing calibration information for a keyboard based on calibration information for a further keyboard.

Referring to FIG. 15, there is described a method of providing (e.g. manufacturing) a keyboard with calibration information.

In a first step 31, a keyboard with a touch sensor is provided (e.g. as has been described above).

In a second step 32, calibration information for the touch sensor is provided where the calibration information relates a second, similar, keyboard.

In some embodiments, the calibration information relates to a plurality of similar keyboards. In this regard, the calibration information may be determined by testing a plurality of keyboards (as has been described above), where the plurality of calibration information determined for this plurality of keyboards is then combined. For example, the calibration information for each keyboard may be combined by averaging the calibration information determined for each keyboard, or by discarding the minimum or maximum values of the various calibration information. Determining the calibration information using a plurality of keyboards reduces the effect of any abnormalities, for example a manufacturing defect that is present in only a single keyboard.

Therefore, the method of providing a keyboard with calibration information may comprise comprising determining calibration information for a plurality of further keyboards comprising similar touch sensors, combining this calibration information, and associating the combined calibration information with the keyboard. The plurality of further keyboards typically comprise similar keyboards, such as a plurality of keyboards from the same product series). There may be at least two further keyboards, at least five further keyboards, and/or at least ten further keyboards. Combining the calibration information may comprise averaging the calibration information and/or removing extreme (e.g. outlier) values from the calibration information.

Typically, the method of FIG. 15 comprises transmitting the calibration information to the keyboard 2000 and/or to a computer device that is associated with the keyboard.

The keyboard 2000 may comprise storage (e.g. flash storage) that enables the keyboard itself to store the calibration information. This enables the keyboard to be sold as a standalone product that is easy to install.

Equally, the calibration information may be provided to an associated computer device. For example, the calibration information may be output to a computer device that is associated with, and/or connected to, the keyboard 2000.

Equally, the calibration information may be provided separately. For example, a kit of parts may be provided that comprises: the keyboard 2000; and a separate device comprising calibration information. The separate device may comprise a USB drive and/or an SD card so that the calibration information can be downloaded onto another computer device.

Yet further, the calibration information may be downloadable so that a purchaser of the keyboard 2000 is able to find the calibration information online and/or is able to update the calibration information if necessary. In some embodiments, the keyboard is arranged to automatically determine the calibration information using the communication interface and the internet (e.g. when the keyboard is connected to a computer device with an internet connection the computer device may automatically download the calibration information).

The previously described methods have considered the determination of differences for a whole keyboard. This enables calibration information to be determined that can be used for an entire product series.

More generally, calibration information may be determined that is dependent on one or more components of the keyboard, e.g. in dependence on the protective layer 2070 above the touch sensor layer 2060. In another example, the use of mechanical switches for the transmittal mechanisms may affect the touch sensor in a first way, and the use of rubber domes for the transmittal mechanisms may also affect the touch sensor in a second way, where the difference between these transmittal mechanisms may be predictable.

By testing different combinations of keyboard components it is possible to predict the effect of a combination of components. Factors (e.g. components) that may affect the operation of the touch sensor include:

Keycaps 2050.
Transmittal mechanisms 2030 (e.g. whether domes are used, whether mechanical switches are used, which mechanical switches are used).
Dimensions (e.g. the height of the keycaps and the perimeter of the keyboard).
The presence, and structure, of a base plate 2010 and/or a backlight (or any other layer of the keyboard). In particular, an arrangement of holes in any of the layers may affect the performance of the touch sensor. Such holes may be present, for example, to enable the passage of transmittal mechanisms for the keys.
The material of the components of the keyboard.
Defects caused by tooling used for assembling (e.g. recurring defects that occur for each keyboard in a product series).

Often these factors combine in unpredictable ways, and so it is preferable to determine the calibration information for a product series by testing a sample from this product series. However, this may be impractical in certain situations. For example, users may wish to modify the keyboard 2000 after purchase (e.g. to change the keycaps). By determining calibration information for one or more keyboard components the effect of such modifications can be estimated. In practice, a user may be able to modify their keyboard and then to download updated calibration information based on the componentry of the modified keyboard.

The disclosures herein extend to the determining of calibration information for a component of a keyboard and the outputting of this calibration information as well as the determining (e.g. calculating) of calibration information for a combination of components and the outputting of this calibration information.

Figure 16:
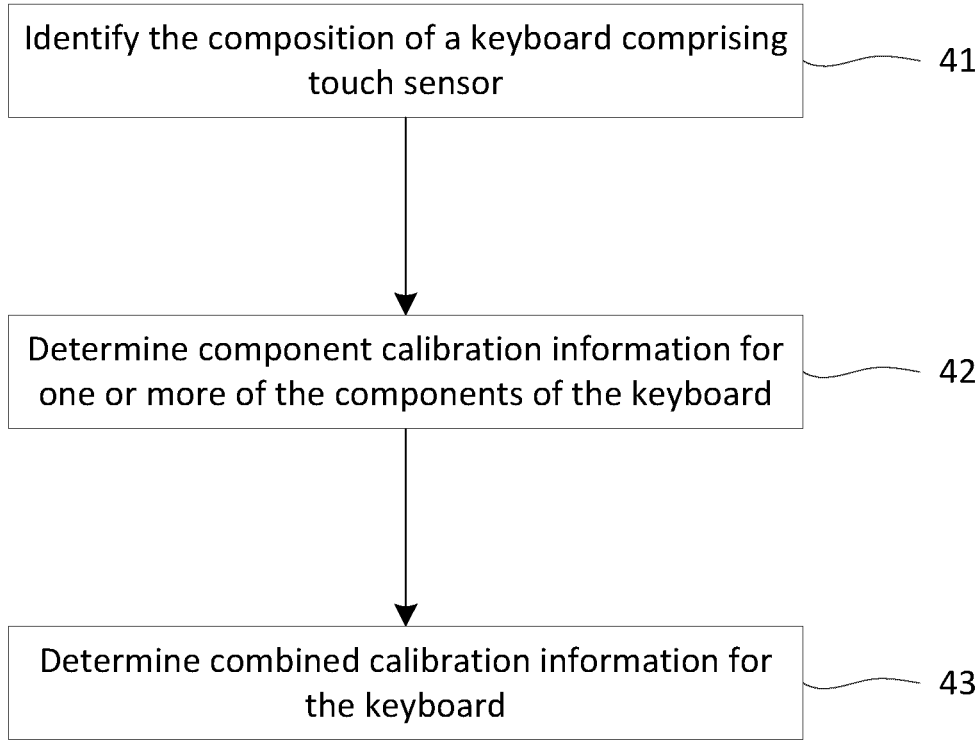
FIG. 16 shows a method for determining calibration information for a keyboard based on the componentry of the keyboard.

Referring to FIG. 16, there is described a method of determining calibration information for a keyboard based on a composition of the keyboard 2000. This method is typically performed by a computer device. The method may be performed by the keyboard itself, where the keyboard may be able to determine its own componentry and to select suitable calibration information from a database of calibration information. Equally, the method may be performed by a computer device that is associated with the keyboard.

In a first step 41, the computer device determines the composition (e.g. the components) of the keyboard 2000.

In a second step 42, the computer device determines component calibration information for one or more of the components of the keyboard (e.g. for the keycaps, for the transmittal mechanisms, for any backlight layer, etc.). This component calibration information may be taken from a database of information, which database is formed by testing various combinations of components.

In a third step 43, the computer device determines calibration information for the entirety of the keyboard based on the component calibration information. In a simple example, this may comprise summing the differences associated with each component. It will be appreciated that more complex functions may be used to combine the component calibration information, where these functions may, for example, be determined based on the testing of various combinations of components.

The calibration information for a component of a first keyboard may be determined based on the calibration information determined for a similar component of a second keyboard so that, as described previously, calibration information for a keyboard can be determined based on the calibration of other keyboards.

Figure 17:
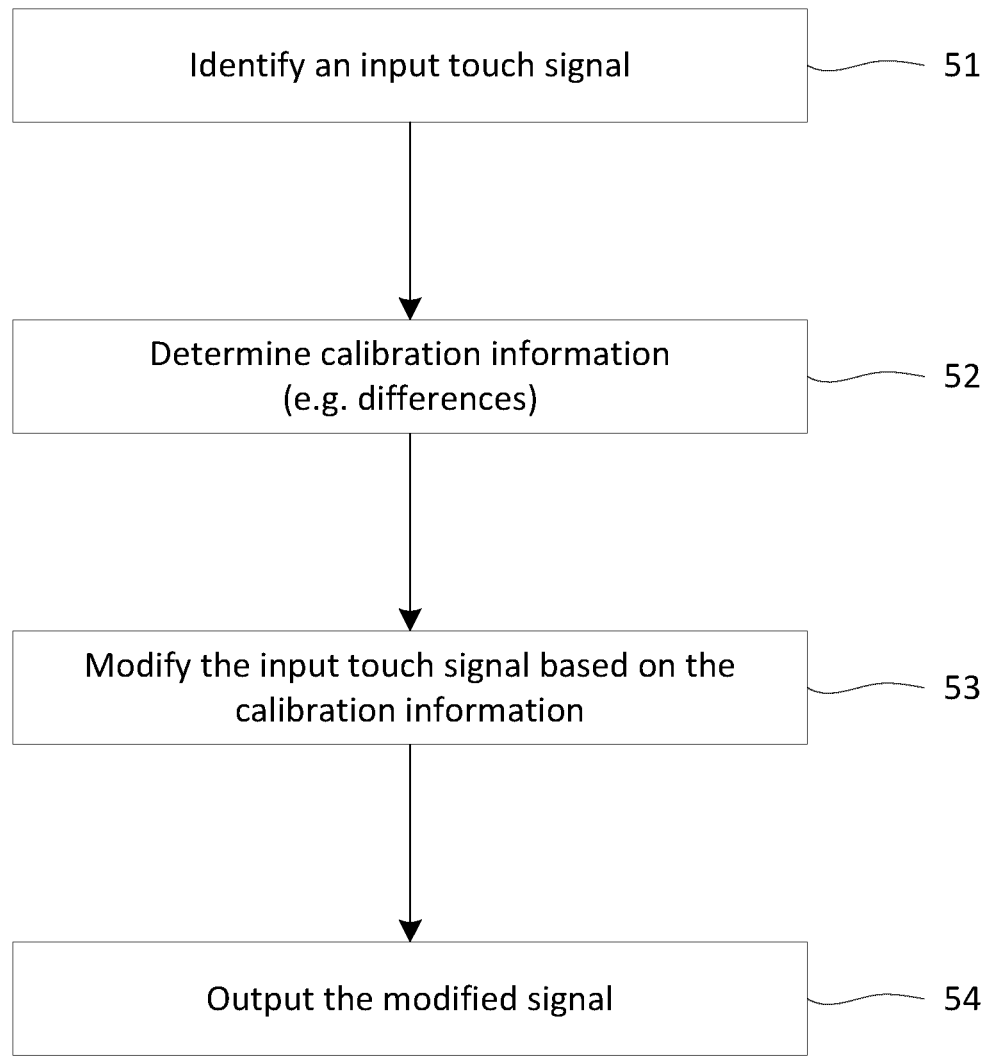
FIG. 17 shows a method of operating a keyboard based on calibration information.

Referring to FIG. 17, there is described a method of operating the keyboard 2000. This method may be performed by the keyboard itself or may be performed by an associated computer device (e.g. a computer device into which the keyboard is plugged).

In a first step 51, the computer device identifies an input touch signal (e.g. a gesture). For example, the input touch signal may be determined by the touch sensor identifying a change in a local electric field.

In a second step 52, the computer device determines calibration information, such as differences. As described previously, the differences may be stored in a database and/or a table of differences. The differences are associated with the composition of the keyboard 2000 so that the differences are typically determined by performing the calibration method of FIG. 11 on a different keyboard of the same composition. These differences are then stored on the keyboard for use in this method.

In a third step 53, the computer device modifies the input touch signal based on the calibration information. Typically, this comprises combining the input touch signal with a stored difference to obtain a modified touch signal that closely relates to an actual touch input. For example, where the user has touched the 'f' key, the input touch signal may seem to indicate that the user has touched the 'g' key instead. The calibration information that is applied to this input touch signal typically comprises a difference, e.g. a vector, that identifies that input signals suggesting a touch on the 'g' key actually relate to touches on the 'f' key.

In a fourth step 54, the computer device outputs the modified signal. For example, the modified signal may be transmitted to another computer device.

Equally, the computer device may provide an output based on the modified signal. For example, the computer device may determine a gesture performed by a user and/or a location of a gesture performed by a user and consequently perform an action such as scrolling across a page, moving a mouse pointer, displaying a text input, and/or transmitting a signal (e.g. sending an email).

Figure 13:
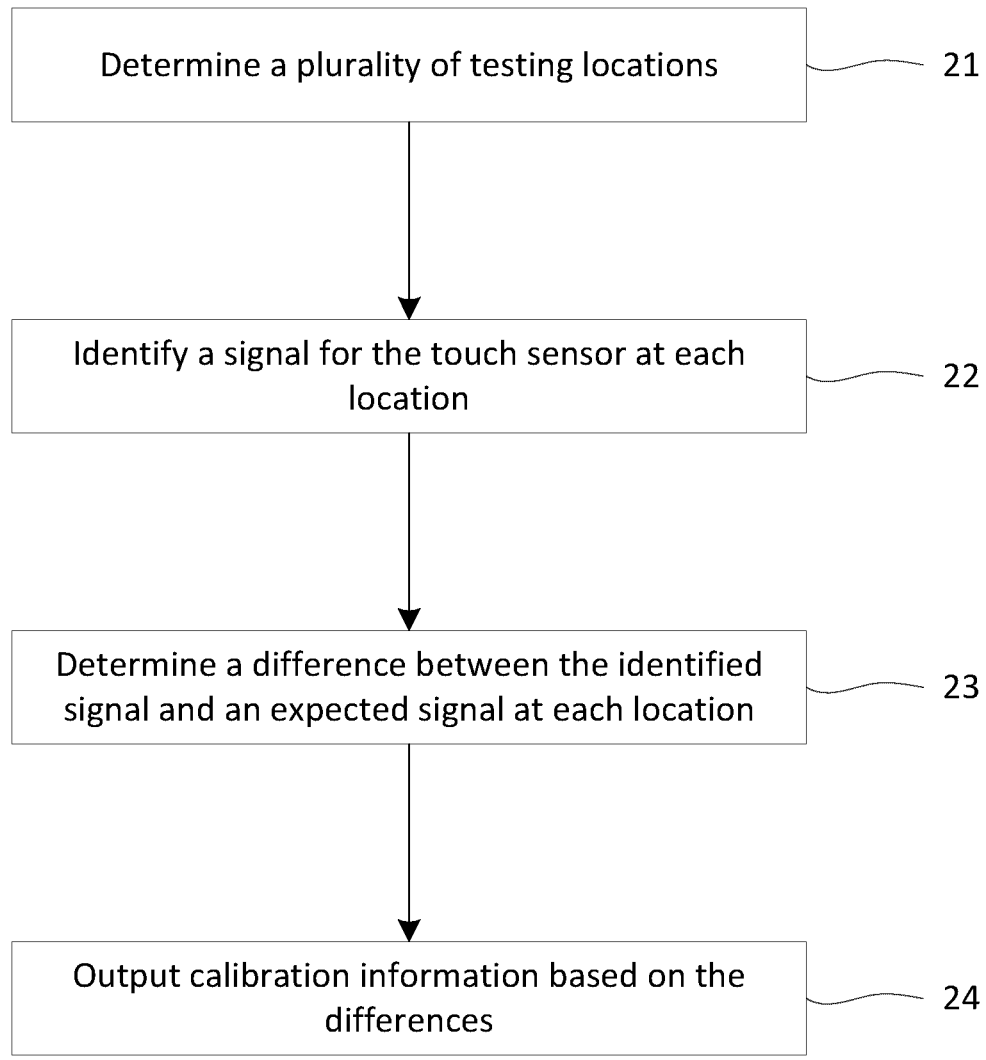
FIG. 13 shows another method of calibrating the touch sensor.

As has been described with reference to FIG. 13, the differences are typically determined for a plurality of locations on the keyboard. In practice, a touch input may be identified at a location that is not one of these plurality of locations. In such a situation, the second step 42 of determining the calibration information may comprise one or more of: determining calibration information for a first location based on calibration information for a second location (e.g. where the second location is the closest location for which calibration information has been determined); and determining calibration information for a first location by interpolating and/or extrapolating from calibration information for other locations.

Where a grid of differences is determined (as has been described with reference to FIG. 13 and FIGS. 14a-14c) calibration information for a first location may be determined by interpolating between calibration information for two or more neighbouring locations.

In this regard, the calibration information typically comprises a table and/or database of datapoints, where each datapoint relates to a different location on the keyboard.

Figure 18:
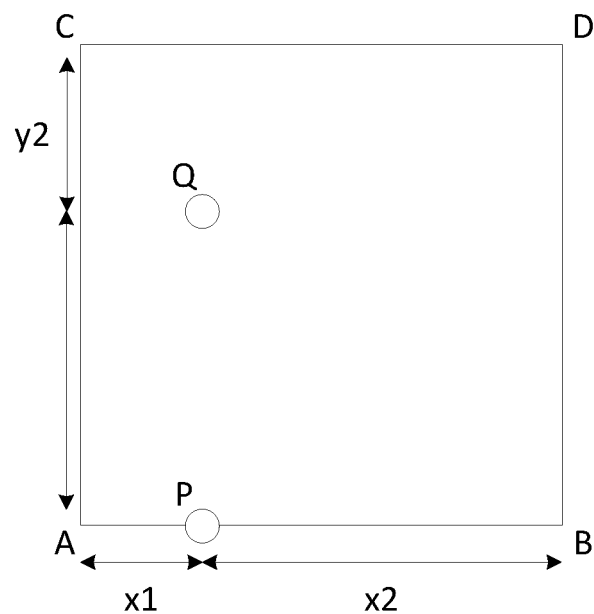
FIG. 18 shows a method of interpolating calibration information.

Referring to FIG. 18, there is shown an example in which calibration information (e.g. differences) are known for four corners, A, B, C, and D, of a grid square. A touch is detected within this grid square, which touch is located at a touch point P that is a horizontal distance x1 from A and a horizontal distance x2 from B.

The difference at the touch point P may be calculated using a linear interpolation as:

$$\delta_P = \delta_A + (\delta_B - \delta_A)\frac{x1}{x1 + x2}$$

It will be appreciated that this is only a simple example and that more complex (e.g. non-linear) interpolations may be used. Furthermore, the interpolation may be dependent on more than two known differences (e.g. if the touch point is within the grid square of FIG. 16 then the difference for the touch point may depend on the differences at each of A, B, C, and D (and/or further differences).

As an example of a more complex interpolation, a bilinear interpolation may be used. For example, the difference at the touch point Q, which is a horizontal distance x1 from A, a horizontal distance x2 from B, a vertical distance y1 from A, and a vertical distance y1 from C, may be calculated using a bilinear interpolation as:

$$\delta_Q = \frac{1}{(x1+x2)(y1+y2)}[x2\,x1]\begin{bmatrix}A & C\\ B & D\end{bmatrix}\begin{bmatrix}y2\\ y1\end{bmatrix}$$

As has been described above, in some embodiments the touch sensor layer 2060 comprises holes that are arranged to allow the passage of one or more of: light, hook mounts, transmittal mechanism, and fluids. The holes may be arranged to minimise the effect of the holes on the touch sensor layer (e.g. the holes may be arranged to be enclosed by the electrodes). However, even where the holes are arranged in such a way, the holes will typically have some effect on the response of the touch sensor.

Therefore, according to the present disclosure, there is described a combined touch sensor and keypress sensor layer. Such a combined layer may still comprise holes for light, hook mounts, drainage of fluids etc. or may comprise no holes. Furthermore, any of the features described above with reference to the touch sensor layer 2060 may be implemented with the combined touch sensor and keypress sensor layer.

Figure 19:
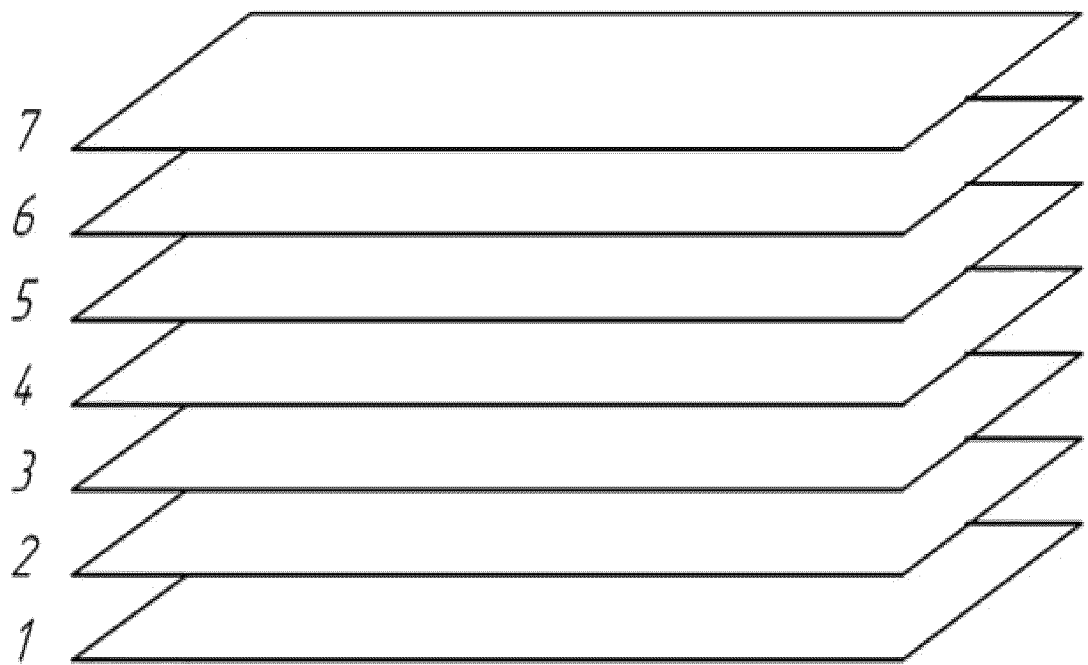
FIG. 19 shows a keyboard comprising a plurality of layers, including a layer that is a combined touch sensor and keypress sensor.

Referring to FIG. 19, there is shown an embodiment of a keyboard that comprises a plurality of layers, including a combined touch sensor and keypress sensor layer.

An exemplary arrangement of layers includes:
1. The base plate 2010.
2. The combined keypress sensor and touch sensor layer.
3. The transmittal mechanisms 2030.
4. (optionally) A layer of adhesive.
5. (optionally) A keypress mechanism mounting layer.
6. The keypress mechanisms 2040.
7. The keycaps 2050.

More generally, the disclosure herein extends to a combined touch sensor and keypress sensor layer that may be used in any keyboard that is arranged to detect touches (e.g. such a combined touch sensor and keypress sensor layer may be used in keyboard with different arrangements of layers).

The touch sensor of the combined touch and keypress sensor layer is typically composed from a single or multi-layer flexible or rigid printed circuit board (e.g. made of polyethylene film, FR4, polyamide or other material) that is capable of detecting a touch on or above the surface of the keys. The touch sensor layer typically comprises a matrix of electrodes connected to each other in channels that form transmitting and receiving channels, as has been described above. The touch sensor in combination with a control unit of the keyboard scans for touch inputs. To do this, the control unit alternately (in sequence) supplies voltage pulses to the transmitting conductive lines of the touch sensor. When a user's hands, or an object such as a touch stylus, contacts (or approaches) the keys, the alteration in the local electric field is detected by the control unit based on the voltage/current in the receiving conductive lines of the touch sensor.

The keypress sensor of the combined touch and keypress sensor layer is arranged to detect the depression of one or more keys. The keypress sensor may comprise one or more layers of polyethylene film or other material (e.g. FR4 or polyamide), with a pattern of conductive lines combined in a single structure so as to form a matrix of transmitting and receiving channels. The keypress sensor in combination with a control unit of the keyboard scans for key presses. To do this, the control unit alternately (in sequence) supplies voltage pulses to the transmitting conductive lines of the keyboard sensor. When the transmittal mechanisms contact (or approach) the conductive lines of the keypress sensor, this contact is detected by the control unit based on the voltage/current in the receiving conductive lines of the keypress sensor.

The keypress sensor is typically arranged to detect keypresses at fixed locations (e.g. sensors of the keypress sensor are typically located beneath the keycaps), while the touch sensor is typically arranged to detect touches across the surface of the keyboard. Therefore, the electrodes of the keypress sensor are typically arranged to be accessible/exposed at these locations; these exposed portions of the electrodes may be linked by connecting portions of the electrodes that are not exposed (e.g. that run beneath the touch sensor electrodes in a lower layer of the combined touch sensor and keypress sensor).

According to the present disclosure, there is described a combined keypress sensor and touch sensor layer that comprises a plurality of touch sensor electrodes and a plurality of keypress sensor electrodes. The touch sensor electrodes and keypress sensor electrodes are arranged so as not to interfere with each other.

Typically, for optimal operation of the touch sensor, the touch sensor electrodes are located over (almost) the entire surface of the touch sensitive area. The touch sensor electrodes are typically located over the majority of the top layer of the combined keypress sensor and touch sensor layer. In some embodiments, the receiving touch sensor electrodes and transmitting touch sensor electrodes are located on different layers, where these different layers are typically each near the top of the combined keypress sensor and touch sensor layer.

Typically, the exposed portions of the keypress sensor electrodes are located under the keys, and more specifically under the transmittal mechanisms 2030 of the keys (e.g. the silicone domes). Equally, the exposed portions may be arranged to be beneath the keycaps and/or beneath protrusions of the keycaps.

The combined keypress sensor and touch sensor layer may be arranged so that the exposed portions of the keypress sensor electrodes are located at intersections of the touch sensor electrodes. Equally, these exposed portions may be located in another arrangement.

Figure 20:
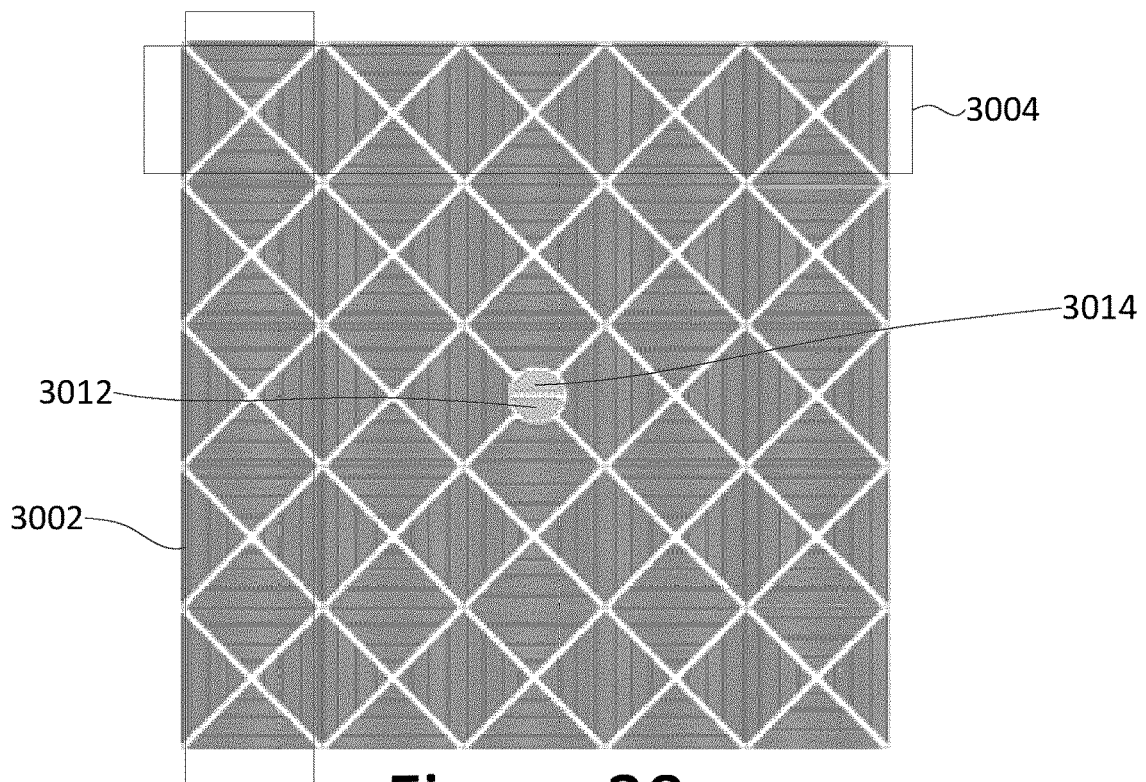
FIG. 20 shows an exemplary combined touch sensor and keypress sensor layer according to the present disclosure.

Typically, the touch sensor electrodes are arranged to surround and/or avoid the exposed portions of the keypress sensor electrodes so that these two sets of electrodes do not affect each other. Such an arrangement is shown in FIG. 20, which shows a touch sensor receiving electrode 3002, a touch sensor transmitting electrode 3004, a keypress sensor receiving electrode 3012, and a keypress sensor transmitting electrode 3014. As can be seen in FIG. 20, the touch sensor electrodes and the exposed portions of the keypress sensor electrodes are separated so that these sets of electrodes do not interfere with each other.

It will be appreciated that the arrangement of receiving and transmitting electrodes of the touch sensor and keypress sensor may be altered (e.g. the rows of the touch sensor may be the receiving electrodes with the columns being the transmitting electrodes).

The keypress sensor electrodes are arranged to have an exposed portion located under each of the keys of the keyboard. These exposed portions are exposed to the transmittal mechanisms 2030 (or to another component that moves when the keycaps 2050 are pressed) so that the transmittal mechanisms are able to approach and/or contact the exposed portions. The exposed portions are typically connected by unexposed connecting lines, which are located beneath the touch sensor electrodes, so that away from the exposed portions the touch sensor electrodes are located on the top layer of the combined touch sensor and keypress sensor layer.

The exposed portions may be entirely exposed to the keys, or may be locations where touch sensor electrodes have not been printed so that a keypress sensor electrode is able to determine the approach/contact of an associated key at this unprinted area.

At the locations of the exposed portions of the keypress sensor electrodes, the touch sensor electrodes may be arranged to pass beneath the keypress sensor electrodes so as to provide continuous touch sensor electrodes.

Equally, the touch sensor electrodes may be arranged to circumvent or 'walk around' the exposed portions.

The combined touch sensor and keypress sensor layer typically comprises one or more of:
  A first (e.g. top) layer that comprises touch sensor electrodes and exposed portions of keypress sensor electrodes. The exposed portions are typically located one or more of:
    adjacent (e.g. beneath) the keys;
    adjacent (e.g. beneath) the transmittal mechanisms; and
    adjacent (e.g. beneath) conductive coatings associated with the keys.
  Therefore, when a key is depressed, one or more of: the key, the transmittal mechanism associated with the key, and the conductive coating associated with the key, approaches a corresponding exposed portion of the keypress sensor electrodes.
  A second (e.g. bottom) layer that comprises connecting lines that connect the exposed portions of the keypress sensor electrodes.

The second layer may comprise connecting lines that connect touch sensor electrodes to either side of the exposed portions of the keypress sensor electrodes. Equally, the touch sensor electrodes may be located wholly on the first layer, where the electrodes are arranged to avoid and/or circumvent the exposed portions of the keypress sensor electrodes. For example, the touch sensor electrodes may be arranged in straight lines between the exposed portions of the keypress sensor electrodes and may be arranged in curved lines around the exposed portions so as to avoid the exposed portions (the touch sensor electrodes may then be narrower near the exposed portions so that only the arrangement of those touch sensor electrodes near the exposed portions is altered).

The keypress sensor electrodes can be considered as having two sections: exposed portions, which are located on the first layer of the combined touch sensor and keypress sensor layer, and connecting lines, which are typically located on the second layer of the combined touch sensor and keypress sensor layer. Each exposed portion comprises a part of a receiving electrode and a part of a transmitting electrode, where the receiving electrodes of each open portion are connected by receiving connecting lines (in the second layer) and the transmitting electrodes of each open portion are connected by transmitting connecting lines (in the second layer).

The combined touch sensor and keypress sensor layer typically comprises a printed circuit board (PCB) that includes the layers. Typically, the keypress sensor and the touch sensor are conductive patterns (electronic layouts) applied to a film or other material. Therefore, these sensors can be applied to the film to form an arrangement of layers as described herein, in which a first layer comprises portions of electrodes for each of the touch sensor and the keypress sensor and in which the electrodes of these sensors are arranged so that they can perform their functions without interfering with each other.

In some embodiments, the exposed portions are arranged to be beneath conductive coatings that are associated with the keys and/or the transmittal mechanisms. As explained above, the transmittal mechanisms 2030 may comprise a conductive coating 2034; the exposed portions of the keypress sensor electrodes may be arranged so that when a key is pressed, a corresponding conductive coating contacts one of the exposed portions to connect a transmitting keypress sensor electrode and a receiving keypress sensor electrode. This enables accurate detection of keypresses. Equally, keypresses may be determined by detection of a movement of the conductive coating (or the transmittal mechanism, or the key), where this movement alters a local electric field near the keypress sensor electrodes. Such an implementation enables keypresses to be detected even when the key is not fully depressed.

The keyboard typically comprises a control unit that is connected to the touch sensor electrodes and the keypress sensor electrodes so as to detect touch inputs and keypresses. The control unit may be arranged to process signals from these sets of electrodes simultaneously or sequentially. The control unit may be a part of the combined touch sensor and keypress sensor mechanism, or may be located separately.

The signals transmitted through the transmitting electrodes of the touch sensor and the keypress sensor may differ in magnitude. In this regard, particularly in situations where the pressing of a key is arranged to connect a transmitting electrode and a receiving electrode, the control unit is able to detect presses of keys even when a small voltage/current is supplied to the transmitting electrodes of the keypress sensor. A touch input is typically detected at a substantial distance from the touch sensor, and so the magnitude of the voltage and/or current supplied to the transmitting electrodes of the touch sensor may be substantially greater than the voltage and/or current supplied to the transmitting electrodes of the keypress sensor.

Combining the touch sensor layer 2060 and the keypress sensor layer 2020 makes it possible to reduce the number of holes in the touch sensor layer to: obtain a more stable touch sensor pattern, to simplify the assembly of the keyboard module, and to reduce the thickness of the keyboard.

In some embodiments, the first layer of the combined touch sensor and keypress sensor layer comprises lighting elements (e.g. LEDs). Such lighting elements may be located on the first (e.g. top) layer of the combined touch sensor and keypress sensor layer board without interfering with the operation of the touch sensor electrodes or the keypress sensor electrodes. The conductive lines connecting the LEDs and/or the control unit may be located on a third layer of the combined touch sensor and keypress sensor layer without intersecting with the conductive lines of the keyboard matrix and the touch sensor (e.g. a bottom layer beneath the second layer and/or a middle layer in between the first and second layers).

Figure 21:
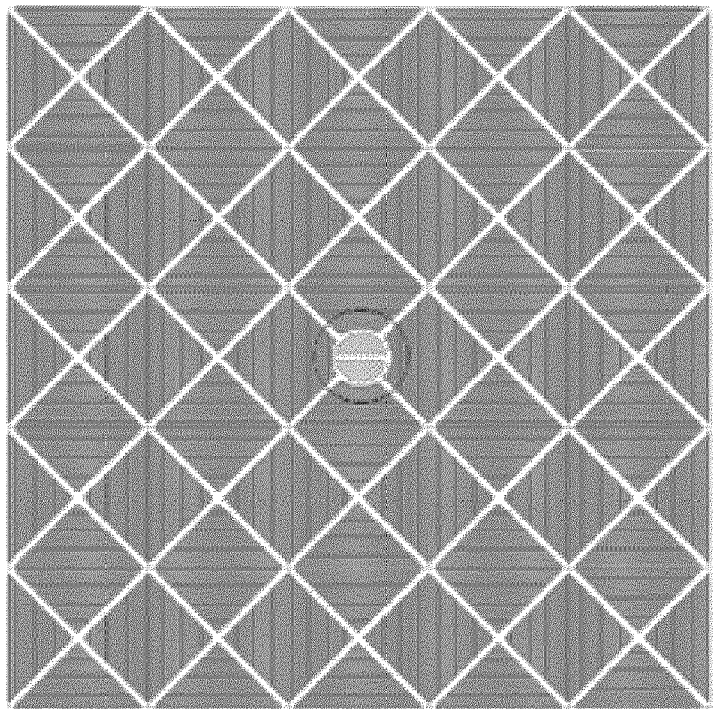
FIG. 21 illustrates the combined touch sensor and keypress sensor layer of FIG. 22 as compared to an alternative touch sensor layer.

Beneficially, as compared to an embodiment with holes in the touch sensor, the use of the combined touch sensor and keypress sensor layer enables the coverage of the touch sensor to be increased. The open portions required for the keypress sensor electrodes can typically be smaller than the holes that would otherwise be required for the transmittal mechanisms. FIG. 21 shows an illustration of the size of the keypress sensors as compared to the size of a hole that would be necessary if a separate keypress sensor layer were to be located beneath a touch sensor layer.

Figure 22:
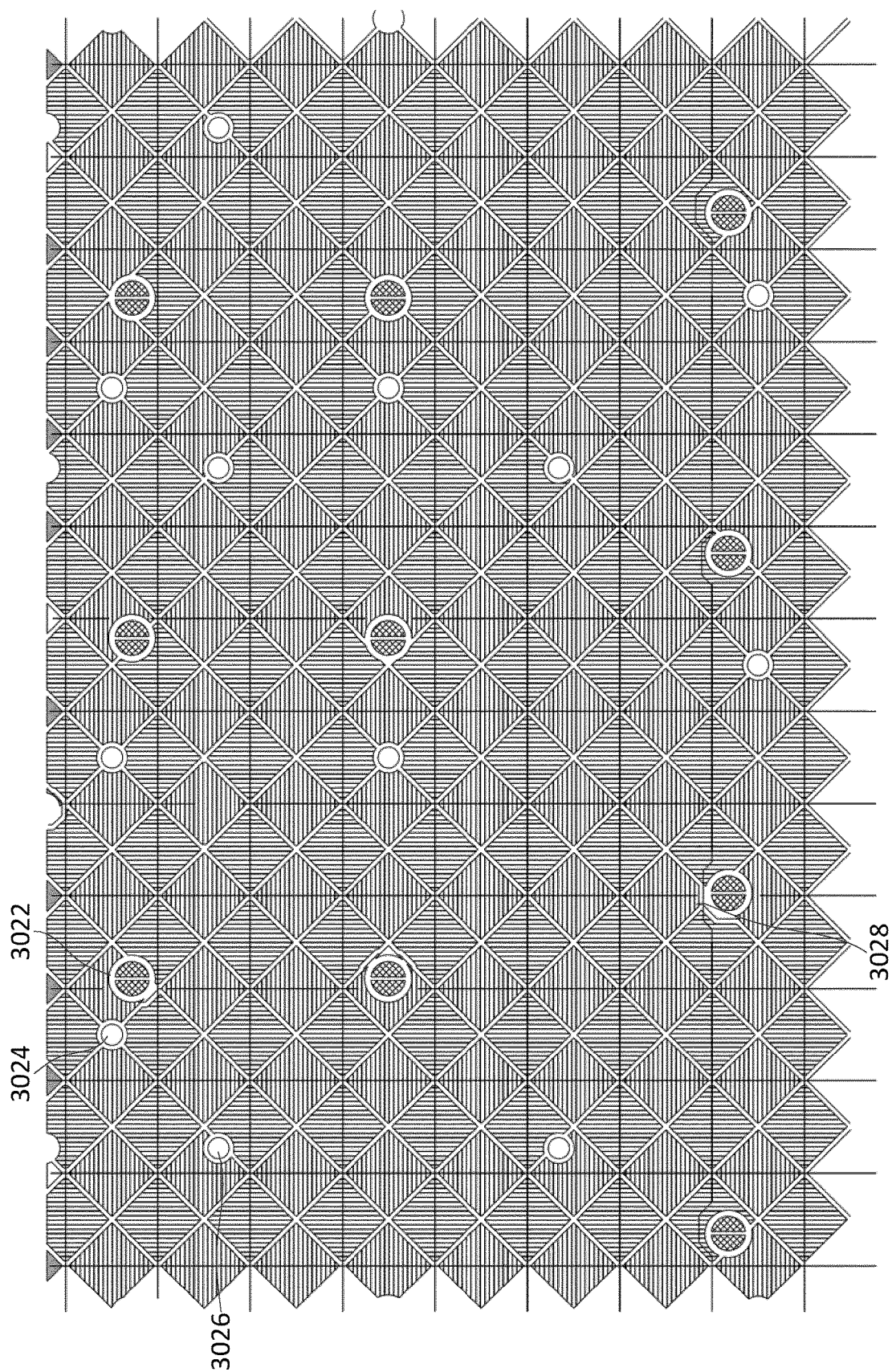
FIG. 22 shows another exemplary embodiment of a combined touch sensor and keypress sensor.

Referring to FIG. 22, there is shown an embodiment of a combined touch sensor and keypress sensor layer that comprises a plurality of exposed portions 3022, with each of the exposed portions being associated with a different key of the keyboard. It can be seen that the exposed portions of the keypress sensor electrodes are spaced from the touch sensor electrodes.

FIG. 22 shows that the combined touch sensor and keypress sensor layer may comprise mounting holes 3024. The mounting holes can be used to provide access through the combined touch sensor and keypress sensor layer so that, for example, a base plate 2010 of the keyboard can be attached to keypress mechanisms 2040 of the keyboard.

Furthermore, FIG. 22 shows that the combined touch sensor and keypress sensor layer may comprise lighting elements and/or holes for lighting elements 3026 (or holes for the passage of lights from lighting elements).

Where the combined touch sensor and keypress sensor layer and/or the keyboard 2000 comprises lighting elements, these lighting elements may be connected by conductive connecting lines. These conductive lines may be a part of the combined touch sensor and keypress sensor layer. For example, the lighting element conductive lines may be located in the second layer of the combined touch sensor and keypress sensor layer alongside the conductive lines of the keypress sensor. Equally, the combined touch sensor and keypress sensor layer may comprise a further layer in which the lighting element conductive lines are located.

Also shown in FIG. 22 is a location 3028 at which a conductive line of the touch sensor avoids one of the exposed portions. As can be seen, the touch sensor electrodes form a regular grid for most of the combined touch sensor and keypress sensor layer. However, in order to avoid the exposed portions of the keypress sensor electrodes, a portion of the touch sensor electrodes may pass through a further layer of the combined touch sensor and keypress sensor layer. Equally, as shown in FIG. 22, the touch sensor electrodes may be arranged so that they avoid the exposed portions while remaining on the first layer. This may comprise the touch sensor electrodes circumventing the exposed portions and/or the touch sensor electrodes being arranged irregularly in the vicinity of the exposed portions.

Referring to FIG. 23, there is shown a side view of a combined touch sensor and keypress sensor layer. This side view shows a first layer 4010 of the combined touch sensor and keypress sensor layer that comprises portions of touch sensor electrodes 4014-1, 4014-2, 4014-3 as well as exposed portions of keypress sensor electrodes 4012-1, 4012-2, 4012-3. The combined touch sensor and keypress sensor layer further comprises a second layer 4020 that comprises connecting lines 4022 that connect the exposed portions of the keypress sensor electrodes.

In practice, the combined touch sensor and keypress sensor layer may comprise a plurality of second layers 4020 (or more generally a plurality of connecting layers) that are used to connect the exposed portions 4012-1, 4012-2, 4012-3. Furthermore, the combined touch sensor and keypress sensor layer may comprise one or more touch sensor electrode connecting layers, which comprise connecting lines that connect portions of the touch sensor electrodes 4014-1, 4014-2, 4014-3 (e.g. those portions of the touch sensor electrodes to either side of the exposed portions of the keypress sensor electrodes). Each of the connecting layers of the combined touch sensor and keypress sensor layer may comprise keypress sensor electrode connecting lines, touch sensor electrode connecting lines, and/or both keypress sensor electrode connecting lines and touch sensor electrode connecting lines.

In some embodiments, the combined touch sensor and keypress sensor layer comprises a ground layer. In particular, the combined touch sensor and keypress sensor layer may comprise a ground layer between the first layer 4010 and the second layer 4020. The use of a ground layer reduces the amount of interference between the touch sensor electrodes and the keypress sensor electrodes; this increases accuracy and decreases the likelihood of a false touch signal or keypress signal being detected.

It will be appreciated that the 'keypress sensor electrodes' may be provided as a touch sensor, wherein keypresses are detected by consideration of, for example, a capacitive keypress sensor. Therefore, the disclosures described with reference to the combined touch sensor and keypress sensor may be combined with the other disclosures herein, such as those disclosures relating to the detection of keypresses using a touch sensor.

Sensor Scanning Rate

In some embodiments a scanning time or frequency of the keypress sensor, or of a line (e.g. an electrode) of the keypress sensor, is dependent on a scanning time or frequency of the touch sensor, or of a line (e.g. an electrode) of the touch sensor. Similarly, a scanning time or frequency of the touch sensor, or of a line (e.g. an electrode) of the touch sensor, may be dependent on a scanning time or frequency of the keypress sensor, or of a line (e.g. an electrode) of the keypress sensor.

In particular, the scanning of one or more lines (rows or columns) of the keypress sensor is typically arranged to occur alternately with the scanning of one or more corresponding lines (rows or columns) of the touch sensor.

In some embodiments, it may be desirable to scan the keypress sensor more frequently or less frequently than the touch sensor. Therefore, the scan rate for one or more lines of the keypress sensor may be an integer multiple of the scan rate for one or more lines of the touch sensor or the scan rate for one or more lines of the touch sensor may be an integer multiple of the scan rate for one or more lines of the keypress sensor.

The scan rate for the two sensor layers may both differ and alternate; for example, a line of the touch sensor may be scanned at a frequency of 4 Hz, with a corresponding line of the keypress sensor being scanned at 1 Hz. The line of the touch sensor (and/or the line of the keypress sensor) may be arranged to skip a scan based on the scan frequency of the line of the other layer. For example, a scan pattern may be:
- 0.00 seconds: scan touch sensor (drive the rows of the touch sensor);
- 0.25 seconds: scan touch sensor (drive the rows of the touch sensor);
- 0.50 seconds: scan touch sensor (drive the rows of the touch sensor);
- 0.75 seconds: scan keypress sensor (and do not drive the rows of the touch sensor);
- 1.00 seconds: scan touch sensor (drive the rows of the touch sensor);
- 1.25 seconds: scan touch sensor (drive the rows of the touch sensor);
- 1.50 seconds: scan touch sensor (drive the rows of the touch sensor); and
- 1.75 seconds: scan keypress sensor (and do not drive the rows of the touch sensor).

Typically, the scanning of the touch sensor and/or the keypress sensor is controlled by a control unit (not shown) of the keyboard 2000, which control unit is arranged to sense a keypress and/or a touch of a user.

More generally, the scan rate and/or scan pattern of a line of the keypress sensor and/or a line of the touch sensor may also depend on one or more of:
- another components of the keyboard 2000;
- a mode of the keyboard; e.g. whether the keyboard is in a pointer input mode or a keypress detection mode; and
- a user input.

In general, the control unit is typically arranged to detect keypresses at a time where the detection of the keypresses is not substantially affected by a signal relating to the touch sensor and the control unit is arranged to detect touch inputs at a time where the detection of a touch input is not substantially affected by a signal relating to the keypress sensor. In order to achieve this, the time at which keypresses are detected is typically arranged to not overlap with a time during which a signal of the touch sensor is driven; more specifically, the time at which keypresses are detected may be offset from the time during which a signal of the touch sensor is driven such that there is not a substantial residual effect within the relevant keypress sensor due to the driving of the touch sensor.

Typically, the touch sensor and the keypress sensor each comprise a grid of sensors; therefore a keypress on one side of the keyboard 2000 may be reliably detected while a column of the touch sensor on the other side of the keyboard 2000 is driven. Therefore, it is not necessary for the entirety of the touch sensor and the entirety of the keypress sensor to be assessed at different times. Instead, the detection of signals by a line of the keypress sensor is dependent on the driving of a line of the touch sensor and the detection of signals by a line of the touch sensor is dependent on the driving of a line of the keypress sensor.

Therefore, in some embodiments, at a first time the control unit is arranged to detect a keypress relating to a keypress sensor in a first area of the keyboard and to drive a signal relating to a touch sensor in a second area of the keyboard, where the first area is spaced from the second area. The control unit may further be arranged to detect a keypress relating to a keypress sensor in the second area of the keyboard at a second time, wherein the second time is selected so that the keypress sensor in the second area of the keyboard is not substantially affected by the signal driven in relation to the touch sensor at the first time. The control unit may be arranged to drive a signal relating to a touch sensor in the first area (or a third area) of the keyboard at the second time.

In some embodiments, each of the touch sensor and the keypress sensor are arranged to scan at the same frequency, e.g. 100 Hz, in an alternating pattern (so the scanning of the touch sensor may start at t=0 s and the scanning of the keypress sensor may start at t=0.005 s). It will be appreciated that other scanning rates may be implemented.

In various embodiments, one or more of the other components of the keyboard is arranged to have an operating frequency that depends on (e.g. differs from) the scanning frequency of the touch sensor. For example, the backlight may be provided using pulse-width modulation, where the frequency of this pulse-width modulation may depend on the scanning frequency of the touch sensor.

The use of such sensor scanning rates is of particular benefit with the combined touch sensor and keypress sensor layer disclosed herein, due to the compact nature of this layer (and hence the proximity of the touch sensor electrodes and the keypress sensor electrodes).

Touch Modes

As described above, typically, the keyboard 2000 has a number of input modes, where the keyboard is capable of switching between the input modes. In particular, the keyboard typically has at least a pointer input mode and a keypress input mode. The operation of the touch sensor may also differ depending on the input mode that is selected.

In particular, the scanning mode of the keyboard may be dependent on the input mode of the keyboard. As examples, when the keyboard is in a pointer input mode, the default scanning mode may be the touch scanning mode. Equally, when the keyboard is in the keypress input mode the default scanning mode may be the keypress scanning mode. When an unexpected input is detected (e.g. a keypress in the pointer input mode), the keyboard may switch the input mode and/or the scanning mode. It will be appreciated that a variety of input modes are possible, e.g. there may be a mode in which both touch events and keypress events are expected. In such an input mode, the default scanning mode is typically the touch scanning mode as described above.

In various embodiments, one or more of the following inputs are used to change between modes:
- a certain keypress relating to a keycap 2050 of the keyboard 2000 (e.g. 'F12');
- a combination of keypresses (e.g. shift+control+F12);
- a gesture detected by the touch sensor layer 2060. In particular, to switch to/from the pointer input mode, a gesture may be used such as a finger tap, a one-finger movement, a two-finger movement, a relative movement of two or more fingers (e.g. a pinch, vertical or horizontal swipes with three or four fingers or a grab in/out with four or five fingers).

In order to avoid undesired switching between input modes and/or scanning modes, one or more of the following factors may also, or alternatively, be considered:
- the position of a user's hands on the keyboard 2000. For example, if the user's hands are positioned in a typical typing position (e.g. with index fingers resting on the 'f' and 'j' keys) the keyboard may be locked in the keypress input mode and/or the keypress scanning mode;
- the number, or location, of a user's hands and/or fingers on the keyboard 2000.
- a resting time of a user's hands, e.g. if they have been stationary on the keyboard for a certain amount of time;
- a previous or current action, e.g. if the user has been typing for a continuous period (or is currently typing). Typically, there is a delay between the last detected keypress and the consideration of a mode-switching input, e.g. it may not be possible to switch to the pointer input mode until at least 100 ms after depressing a keycap in the keypress input mode.
- The context of a connected computer device. In particular, the applications open on the device and the current focus may be determined. For example, where an image editing application is open a grabbing gesture may enter an image editing mode; where a web browser is open, the same grabbing gesture may enter a scrolling mode.

The mode changing inputs and the factors to avoid undesired switching may be controlled by a user.

Alternatives and Modifications

It will be understood that the present invention has been described above purely by way of example, and modifications of detail can be made within the scope of the invention.

In some embodiments, the keyboard 2000 comprises both a keypress sensor layer and a touch sensor layer. For example, the touch sensor layer may cover only a subset of the keyboard, where the touch sensor layer is arranged to detect keypresses in this subset and the keypress sensor layer is arranged to detect keypresses outside of this subset.

While calibration information (and differences) has primarily been described in relation to a location of a touch, it will be appreciated that other types of calibration information may be determined. For example, calibration information may be determined for the magnitude of touch signals so as to provide signals that accurately depict the magnitude of a touch input (and thus allow, for example, keypresses and touch inputs to be differentiated).

The keyboard may comprise a standalone keyboard and/or an integrated keyboard, such as the keyboard of a laptop). Where the keyboard is an integrated keyboard, the calibration information is typically determined when the keyboard is installed in the integrated product (e.g. the calibration information may be determined using an assembled laptop).

The combined touch and keypress sensor layer may comprise further layers, such as a ground layer or a non-conductive layer (e.g. located between the first and second layers) and/or a support layer.

Reference numerals appearing in the claims are by way of illustration only and shall have no limiting effect on the scope of the claims.

The invention claimed is:

1. A method of associating calibration information with a keyboard comprising a touch sensor, the method comprising:
   determining the calibration information using a further keyboard comprising a similar touch sensor; and
   associating the calibration information with the keyboard, wherein the calibration information relates to a difference between an expected touch signal and a detected touch signal.

2. The method of claim 1, wherein the keyboard and the further keyboard are similar keyboards.

3. The method of claim 1, comprising determining keyboard calibration information for a plurality of further keyboards comprising similar touch sensors, combining this keyboard calibration information, and associating the combined calibration information with the keyboard.

4. The method of claim 3, comprising averaging the determined keyboard calibration information or removing extreme values from the determined keyboard calibration information.

5. The method of claim 1, wherein the keyboard and the further keyboard each comprise one or more components, wherein the components of the keyboard are of a same type as the components of the further keyboard.

6. The method of claim 5, wherein the keyboard and the further keyboard comprise a same type of a protective plate, with the protective plate of each keyboard being associated with a respective touch sensor.

7. The method of claim 5, wherein the keyboard and the further keyboard are from a same product series.

8. The method of claim 1, comprising:
   determining a variation between the keyboard and the further keyboard;
   determining modified calibration information based on the calibration information and the variation; and
   associating the modified calibration information with the keyboard.

9. The method of claim 8, wherein the variation is associated with a difference in componentry between the keyboard and the further keyboard.

10. The method of claim 1, wherein associating the calibration information with the keyboard comprises outputting the calibration information to a storage of the keyboard or outputting the calibration information to a separate computer device associated with the keyboard.

11. The method of claim 1, comprising determining the calibration information using a machine or a computer numerical control, CNC, machine.

12. The method of claim 1, comprising determining component calibration information for one or more of the components of the further keyboard, and determining the calibration information based on the component calibration information, wherein the component calibration information for each component relates to a difference between an actual touch signal and a detected touch signal, the difference being attributable to said component.

13. The method of claim 12, comprising determining component calibration information for one or more components of a plurality of further keyboards.

14. The method of claim 1, comprising assembling the further keyboard.

15. A computer device comprising calibration information for a keyboard that comprises a touch sensor, wherein the calibration information is dependent on a further keyboard comprising a similar touch sensor, and wherein the calibration information relates to a difference between an expected touch signal and a detected touch signal.

16. The computer device of claim 15, wherein the computer device is arranged to:
 detect an input touch signal;
 modify the input touch signal based on the calibration information; and
 output the modified touch signal.

17. The computer device of claim 16, wherein:
 modifying the input touch signal comprises modifying one or more of: the direction of the touch signal; the magnitude of the touch signal; and the direction of the touch signal; or
 modifying the input touch signal comprises modifying the input touch signal based on a datapoint of the calibration information; or
 modifying the input touch signal comprises modifying the input touch signal based on a plurality of datapoints of the calibration information.

18. The computer device of claim 17, comprising modifying the input touch signal based on:
 an interpolated datapoint that is determined based on an interpolation of the plurality of datapoints; or
 an extrapolated datapoint that is determined based on an extrapolation of the plurality of datapoints.

19. A method of modifying an input touch signal detected by a keyboard comprising a touch sensor, the method comprising:
 detecting the input touch signal;
 modifying the input touch signal based on calibration information; and
 outputting the modified touch signal;
 wherein the calibration information is determined in dependence on a further keyboard comprising a similar touch sensor; and
 wherein the calibration information relates to a difference between an expected touch signal and a detected touch signal.

* * * * *